US011975298B2

(12) United States Patent
Kato et al.

(10) Patent No.: US 11,975,298 B2
(45) Date of Patent: May 7, 2024

(54) FLUID CONTROLLER AND FLUID MIXER

(71) Applicant: KABUSHIKI KAISHA TOSHIBA, Tokyo (JP)

(72) Inventors: Mitsuaki Kato, Kawasaki Kanagawa (JP); Masato Akita, Kawasaki Kanagawa (JP); Hideaki Okano, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 620 days.

(21) Appl. No.: 17/249,358

(22) Filed: Feb. 26, 2021

(65) Prior Publication Data

US 2022/0080369 A1 Mar. 17, 2022

(30) Foreign Application Priority Data

Sep. 15, 2020 (JP) ................................ 2020-154730

(51) Int. Cl.
*B01F 33/3012* (2022.01)
*B01F 33/301* (2022.01)

(52) U.S. Cl.
CPC ...... *B01F 33/3017* (2022.01); *B01F 33/3012* (2022.01); *B01F 2215/0409* (2013.01); *B01F 2215/0431* (2013.01)

(58) Field of Classification Search
CPC ................ B01F 25/432; B01F 25/4321; B01F 25/4323; B01F 25/43231; B01F 33/3012
USPC ............................. 366/181.5, 336–338, 340
See application file for complete search history.

(56) References Cited

U.S. PATENT DOCUMENTS 1,637,697 A * 8/1927 Jacobsen ............. B01F 25/4323 48/189.4
3,159,312 A * 12/1964 Van Sciver ....... B05C 17/00553 222/326

(Continued)

FOREIGN PATENT DOCUMENTS

CA 2189783 A1 11/1995
EP 3 610 943 A1 2/2020

(Continued)

OTHER PUBLICATIONS

"Creamelt® COC 3D Printing Materials," https://creamelt.com/wp/materials/coc/?v=18a5f226e926, 2 pages (Dec. 16, 2020).

(Continued)

*Primary Examiner* — David L Sorkin
(74) *Attorney, Agent, or Firm* — Finnegan, Henderson, Farabow, Garrett & Dunner, LLP

(57) ABSTRACT

According to one embodiment, a fluid controller includes a fluid channel deforming portion and a mixing portion provided downstream from the fluid channel deforming portion. The fluid channel deforming portion includes an upstream end portion, a first channel, a second channel and a channel terminating portion. At least one of the first and second channels is deformed between the upstream end portion and the channel terminating portion. A region of the second channel in a second cross-section, is increased more than a region of the second channel in the first cross-section, between the upstream end portion ad the channel terminating portion. The mixing portion mixes a plurality of fluids flowing through the fluid channel deforming portion.

20 Claims, 18 Drawing Sheets

(56) References Cited

U.S. PATENT DOCUMENTS

| | | | | |
|---|---|---|---|---|
| 3,195,865 | A * | 7/1965 | Harder | B01F 25/4321 366/337 |
| 3,406,947 | A * | 10/1968 | Harder | B01F 25/4321 366/337 |
| 3,963,221 | A * | 6/1976 | Yi | B01F 25/432 422/261 |
| 4,222,672 | A * | 9/1980 | Shaw | B01F 25/43 366/338 |
| 4,363,552 | A * | 12/1982 | Considine | B01F 25/432 366/340 |
| 6,332,707 | B1 * | 12/2001 | Yamada | B01F 25/432 366/9 |
| 2008/0017246 | A1 | 1/2008 | Tabata et al. | |
| 2014/0233348 | A1 | 8/2014 | Yamamoto et al. | |
| 2022/0234013 | A1 | 7/2022 | Patel et al. | |

FOREIGN PATENT DOCUMENTS

| | | | |
|---|---|---|---|
| JP | H9-512742 | A | 12/1997 |
| JP | 2007-252979 | A | 10/2007 |
| JP | 2008-23418 | A | 2/2008 |
| JP | 2009-30870 | A | 2/2009 |
| JP | 2012-193882 | A | 10/2012 |
| JP | 2013-136040 | A | 7/2013 |
| JP | 2014-231038 | A | 12/2014 |
| JP | 5651787 | B2 | 1/2015 |
| JP | 2016-85033 | A | 5/2016 |
| JP | WO2018/190423 | A1 | 10/2018 |
| JP | 2020-517431 | A | 6/2020 |

OTHER PUBLICATIONS

"Fluidic Factory 3D Printer," https://www.dolomite-microfluidics.com/product/fluidic-factorv-3d-printer/, 2 pages (Dec. 14, 2020).

"Introducing Topas® Elastomer E-140, a COC elastomer," https://www.polyplastics.com/jp/product/lines/coc_e140/index.html, 3 pages (2019).

B. O'Neal, "The Fluidic Factory is the First Commercial 3D Printer for Fabricating Microfluidic Chips & More," https://3dprint.com/124532/fluidic-factory-3d-printer/, 5 pages (2016).

* cited by examiner

FLUID CONTROLLER AND FLUID MIXER

CROSS-REFERENCE TO RELATED APPLICATIONS

This application is based upon and claims the benefit of priority from Japanese Patent Application No. 2020-154730, filed Sep. 15, 2020, the entire contents of all of which are incorporated herein by reference.

FIELD

Embodiments described herein relate generally to a fluid controller having a channel for mixing a plurality of fluids, and a fluid mixer including the fluid controller.

BACKGROUND

Mixture, separation and chemical reaction are carried out for various liquids using a microchannel, for example. Basically, the microchannel generates no turbulence because its channel width is small. The mixture is carried out using vortices of a laminar flow and substance diffusion.

DETAILED DESCRIPTION

According to one embodiment, a fluid controller includes a fluid channel deforming portion and a mixing portion. The fluid channel deforming portion includes an upstream end portion, a first channel, a second channel and a channel terminating portion. The upstream end portion has a first most upstream opening and a second most upstream opening through which fluids are caused to flow from upstream pipes. The first channel communicates with the first most upstream opening. The second channel communicates with the second most upstream opening. The channel terminating portion has a first most downstream opening of the first channel and second most downstream opening of the second channel. The first channel and the second channel are interposed between the channel terminating portion and the upstream end portion. At least one of the first channel and the second channel is deformed between the upstream end portion and the channel terminating portion. A region of the second channel adjacent to the first channel in a second cross-section which is located downstream from a first cross-section and which is perpendicular to an extending direction of the first channel and the second channel, is increased more than a region of the second channel adjacent to the first channel in the first cross-section perpendicular to the extending direction of the first channel and the second channel, between the upstream end portion ad the channel terminating portion. The mixing portion is provided downstream from the first most downstream opening and the second most downstream opening. The mixing portion is configured to mix a plurality of fluids flowing through the first most downstream opening and the second most downstream opening. The mixing portion includes a mixing channel having a third most downstream opening located most downstream of the mixing portion. The third most downstream opening is configured to discharge mixed fluids into which the plurality of fluids are mixed toward a downstream side of the mixing portion.

A fluid mixer includes the fluid controller, an upstream pipe located upstream from the fluid controller, and a downstream pipe located downstream from the fluid controller.

An object of the present embodiments is to provide a fluid controller with high mixing efficiency and a fluid mixer including the fluid controller.

A fluid mixer 10 of each of first to sixth embodiments will be described below with reference to the drawings.

The fluid mixer 10 according to each of the first to sixth embodiments can mix fluids of the same type or different types. Even fluids of the same type may vary in viscosity with temperature, for example. These fluids can be mixed using the fluid mixer 10.

First Embodiment

The fluid mixer 10 of the first embodiment will be described with reference to FIGS. 1 through 5.

Figure 1:
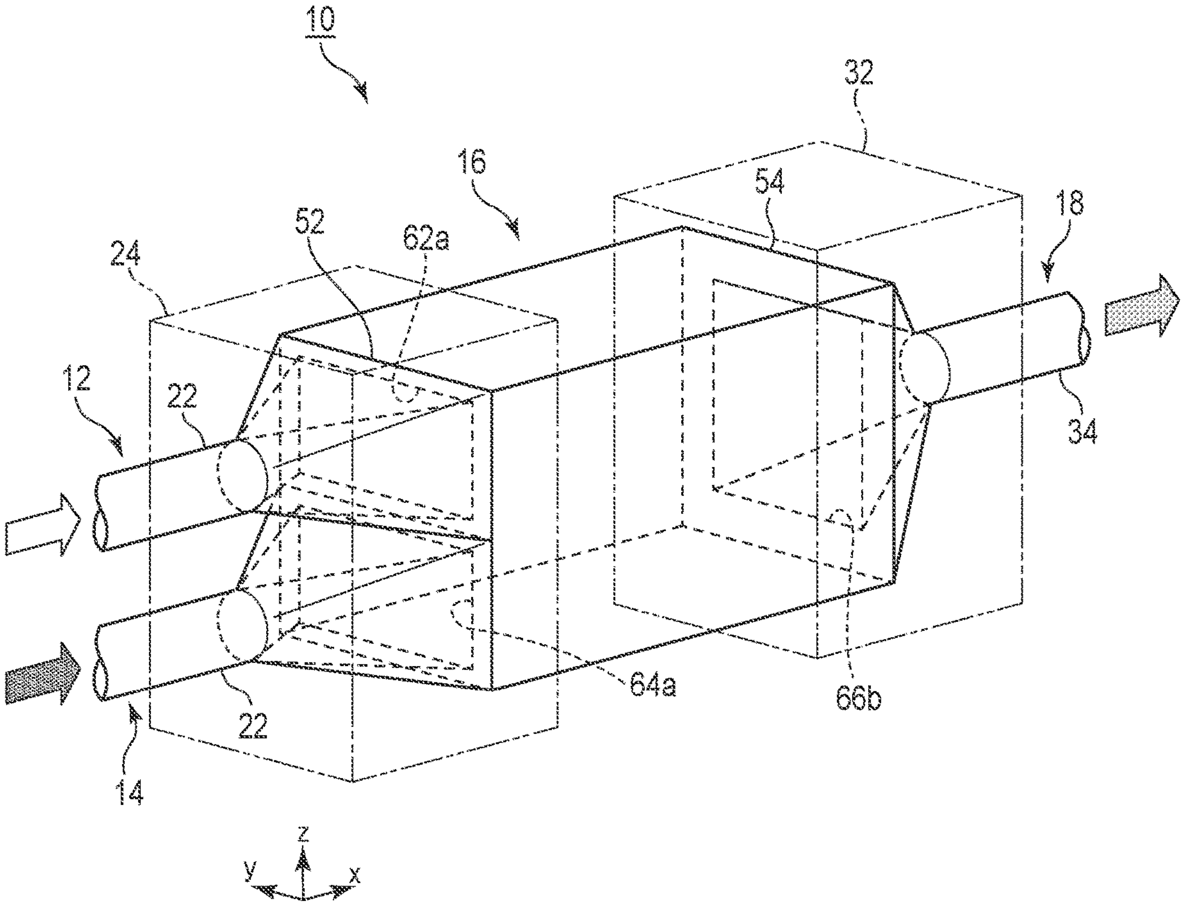
FIG. 1 is a schematic perspective view of a fluid mixer.
Figure 2:
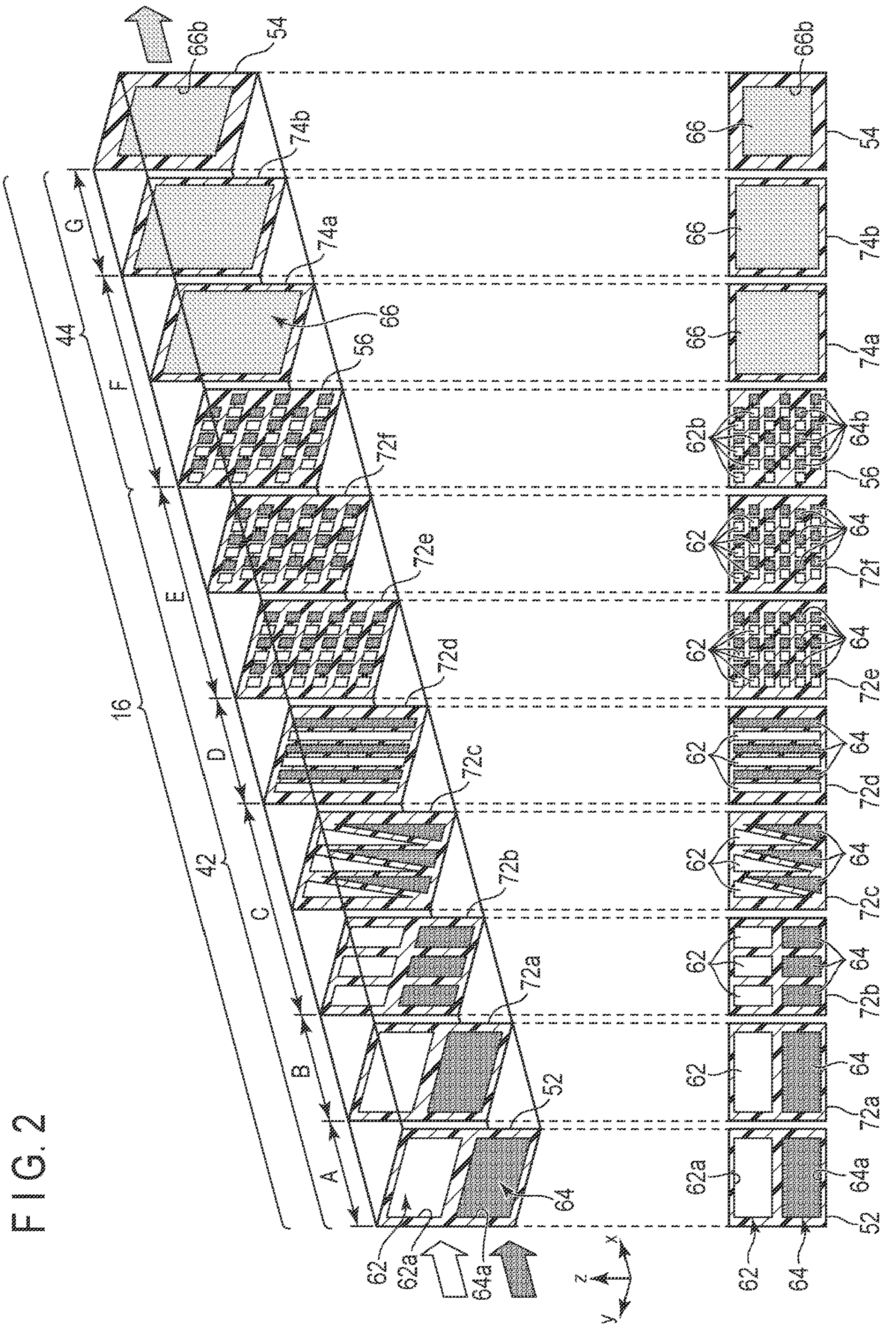
FIG. 2 is a schematic perspective view of a fluid controller of a first embodiment in the fluid mixer, showing the shape of a fluid channel in an appropriate location in the fluid controller.
Figure 3:
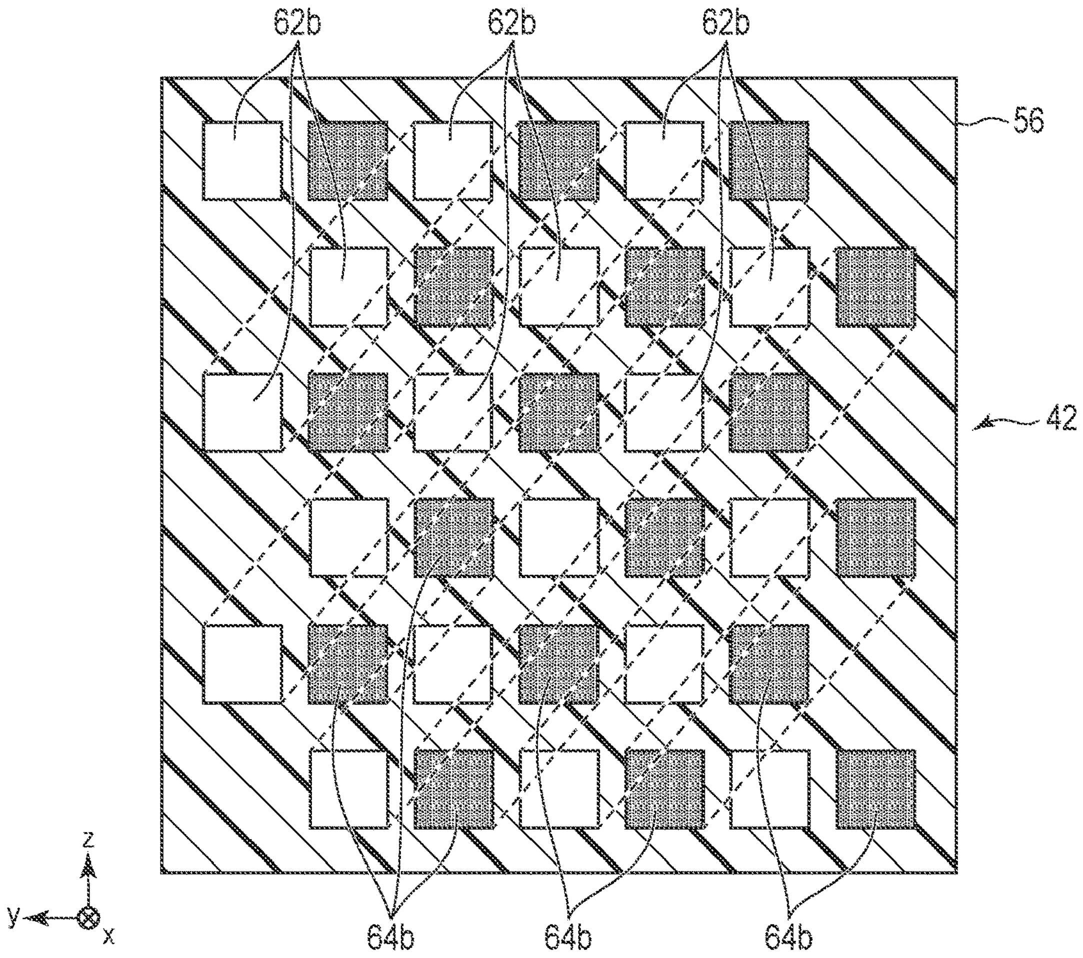
FIG. 3 is a schematic diagram showing the arrangement of first and second fluid channels in the cross-section of a boundary between a fluid channel deforming portion and a mixing portion of the fluid controller of the first embodiment in the fluid controller.
Figure 4:
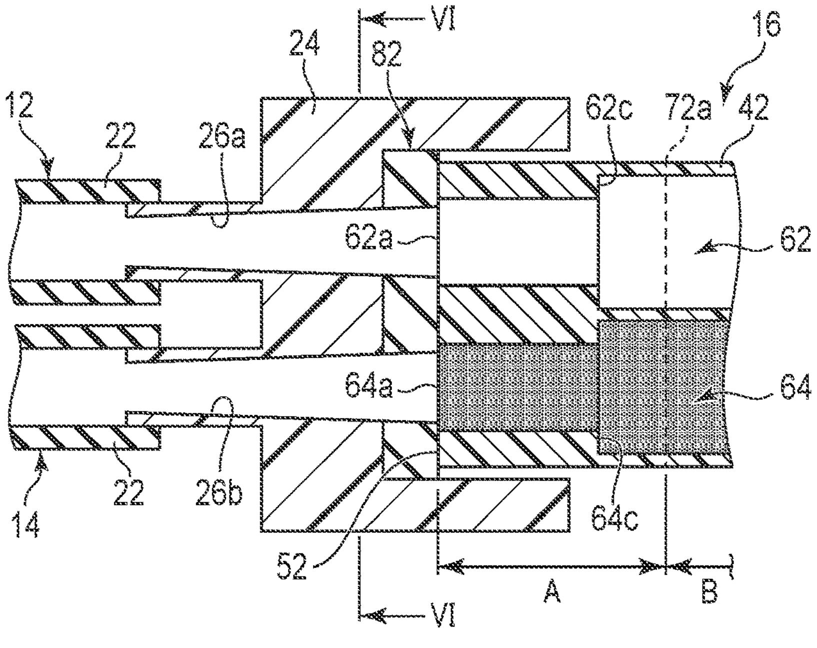
FIG. 4 is a schematic cross-sectional view showing a configuration of a connection between an upstream pipe of the fluid mixer and the fluid controller of the first embodiment.
Figure 5:
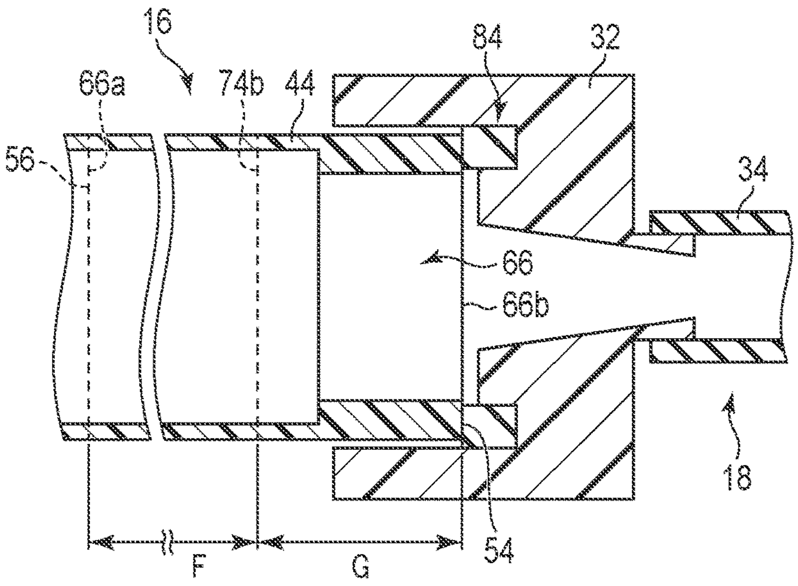
FIG. 5 is a schematic cross-sectional view showing a configuration of a connection between the fluid controller of the first embodiment in the fluid mixer and a downstream pipe of the fluid mixer.

FIG. 1 is a schematic perspective view of the fluid mixer 10. FIG. 2 is a schematic perspective view (cross-sectional view) of a fluid controller 16 in the fluid mixer, showing the shape of a fluid channel in an appropriate location in the fluid controller 16. FIG. 3 shows a cross-section of the fluid controller 16 with respect to its YZ plane. FIG. 4 shows a state of connection between upstream pipes (introduction pre-stage portions) 12 and 14 and the fluid controller 16. FIG. 5 shows a state of connection between the fluid controller 16 and a downstream pipe (discharge post-stage portion) 18.

An X axis is taken in the horizontal direction (channel (fluid channel) extension direction) shown in FIGS. 1 and 2, a Z axis is taken in the vertical direction perpendicular to the X axis, and a Y axis is taken in a direction perpendicular to the X axis and Z axis.

As shown in FIG. 1, the fluid mixer 10 includes the upstream pipes (introduction pre-stage portions) 12 and 14, fluid controller 16 and downstream pipe (discharge post-stage portion) 18.

The first embodiment is directed to an example where the fluid mixer 10 includes two upstream pipes 12 and 14. The upstream pipes 12 and 14 are disposed upstream from the fluid controller 16 to supply (introduce) fluids of the same type or different types to the fluid controller 16. The upstream pipes 12 and 14 each includes, for example, a tube 22 through which a fluid is supplied from a fluid source (not shown), and an upstream connector 24 connected to the tube 22 to connect the tube 22 and the fluid controller 16. The tube 22 is preferably flexible. Instead of the tube 22, for example, a channel made of metal or resin may be used.

The downstream pipe 18 is disposed downstream from the fluid controller 16 to guide the fluid mixed by the fluid controller 16 downstream therefrom. The downstream pipe 18 includes, for example, a downstream connector 32 connected to the downstream side of the fluid controller 16 and a tube 34 connected to the downstream connector 32 to guide the fluid mixed by the fluid controller 16 downstream therefrom. The tube 34 is preferably flexible. Instead of the tube 34, for example, a channel made of metal or resin may be used.

In the first embodiment, the fluid controller 16 will be described as being a rectangular parallelepiped as shown in FIGS. 1 and 2. The fluid controller 16 may take various shapes such as a cylinder, a semicircular cylinder, an elliptical cylinder, and a polygonal cylinder as well as the rectangular parallelepiped.

The fluid controller 16 of the first embodiment includes a fluid channel deforming portion (fluid inlet) 42 and a mixing portion 44. The fluid controller 16 is formed to include the fluid channel deforming portion 42 and the mixing portion 44 in order from upstream to downstream. In the fluid controller 16, a plurality of fluids are introduced simultaneously from upstream of the fluid channel deforming portion 42 into the fluid channel deforming portion 42. In the fluid channel deforming portion 42, the fluid channel is gradually deformed from upstream to downstream such that the fluids flowing through the fluid channel deforming portion 42 are easily mixed in the mixing portion 44 at the proximal end of the fluid channel deforming portion 42. When the fluids are discharged simultaneously from the downstream end of the fluid channel deforming portion 42 toward the mixing portion 44 on the downstream side, the mixing portion 44 mixes the fluids and discharges the mixed fluids toward the downstream pipe 18.

The most upstream end of the fluid controller 16 is defined as an upstream end portion (upstream end face) 52, the most downstream end thereof is defined as a downstream end portion 54, and the boundary between the fluid channel deforming portion 42 and the mixing portion (downstream end of the fluid channel deforming portion 42) is defined as a channel terminating portion (channel interface) 56. The YZ plane of each of the upstream end portion 52 of the fluid channel deforming portion 42 of the fluid controller 16, channel terminating portion 56 and downstream end portion 54 of the mixing portion 44 is rectangular (quadrangular) in the first embodiment. Each of the upstream end portion 52, channel terminating portion 56 and mixing portion 44 along the YZ plane may take various shapes such as a circle, a semicircle, an ellipse, and a polygon as well as the rectangle in accordance with the appearance of the fluid controller 16.

The fluid controller 16 preferably employs one or at least two resin materials selected from acrylic, polycarbonate, cycloolefin copolymer, cycloolefin polymer, polymethylpentene, polystyrene, polymethyl (meta) acrylate, polyethylene terephthalate and the like.

A method of fabricating the fluid controller 16 will be described briefly. For example, a stereolithography apparatus can be used to fabricate the fluid controller 16. The stereolithography apparatus repeats forming a cured resin layer by irradiating an image forming material layer of a liquid photopolymer with light to laminate a plurality of cured resin layers and thus fabricate a solid object. The fluid controller 16 can be fabricated using a three-dimensional printer for fabricating a three-dimensional modeling object by fused filament fabrication. The fluid controller 16 can also be fabricated using, for example, a diffusion bonding apparatus for fabricating a three-dimensional modeling object by bonding a plurality of thin plates with holes without gaps. In any of these fabrication methods, the fluid channel deforming portion 42 and mixing portion 44 of the fluid controller 16 are modeled integrally as one unit.

In the first embodiment, the fluid controller 16 will be described as being modeled separately from the upstream connector 24 of the upstream pipes 12 and 14. In the first embodiment, the fluid controller 16 will also be described as being modeled separately from the downstream connector 32 of the downstream pipe 18.

As described above, the fluid controller 16 shown in FIG. 2 is formed as, for example, a rectangular parallelepiped extending in the X-axis direction. The fluid channel deforming portion 42 of the fluid controller 16 includes the upstream end portion 52, channel terminating portion 56, a first channel (fluid channel group) 62 and a second channel (fluid channel group) 64. The channels 62 and 64 are arranged side by side in the fluid channel deforming portion 42. The mixing portion 44 includes a mixing channel 66. The mixing channel 66 is provided downstream from the channels 62 and 64 to communicate with the channels 62 and 64.

The channels 62, 64 and 66 extend almost along the X-axis (longitudinal axis) of the fluid controller 16. The channels 62, 64 and 66 are preferably formed as microchannels, for example. The channels 62 and 64 open at both ends of the fluid channel deforming portion 42 of the fluid controller 16 (upstream end portion 52 and channel terminating portion 56). The channel terminating portion 56 is located at the termination of the channels 62 and 64. The channels 62 and 64 mix a plurality of fluids supplied from the upstream pipes 12 and 14 in the channel 66 following the channels 62 and 64, and causes the fluids to flow through the downstream pipe 18. In the first embodiment, the first and second channels 62 and 64 of the fluid channel deforming portion 42 extend in a same direction from the upstream end portion 52 to the channel terminating portion 56.

The upstream end portion 52 has a first most upstream opening 62*a* and a second most upstream opening 64*a* through which fluids flow from the upstream pipes 12 and 14, respectively. That is, the upstream end portion 52 is divided into two regions of the first and second most upstream openings 62*a* and 64*a*. The first and second most upstream openings 62*a* and 64*a* are both substantially rectangular and are arranged side by side in the Z-axis direction. The first most upstream opening 62*a* is formed on the upper side of the upstream end portion 52 and the second most upstream opening 64*a* is formed on the lower side thereof.

The first and second channels 62 and 64 are interposed between the channel terminating portion 56 and the upstream end portion 52. The channel terminating portion 56 includes first most downstream openings 62*b* of the first channel 62 and second most downstream openings 64*b* of the second channel 64. The first channel 62 cause the first most upstream opening 62*a* and the first most downstream opening 62*b* to communicate with each other. Thus, the first channel 62 includes flow paths, and the second channel includes flow paths. The second channel 64 cause the second most upstream opening 64*a* and the second most downstream openings 64*b* to communicate with each other.

As shown in FIG. 3, the first most downstream opening 62*b* includes a plurality of openings as an opening group. The openings of the first most downstream opening 62*b* are substantially rectangular in the first embodiment, but can be formed in various shapes. The second most downstream opening 64*b* includes a plurality of openings as an opening group. The openings of the second most downstream opening 64*b* are substantially rectangular in the first embodiment, but can be formed in various shapes. The first and second most downstream openings 62*b* and 64*b* are alternately aligned in the Y-axis direction and the Z-axis direction.

Thus, the first channel 62 gradually deforms its shape from the first most upstream opening 62*a* toward the first most downstream opening 62*b*. The second channel 64 gradually deforms its shape from the second most upstream opening 64*a* toward the second most downstream opening 64*b*. The first and second channels 62 and 64 increase in their adjacent region downstream from the upstream side end portion 52.

The term "adjacent region" refers to the length of the outer edges adjacent in the Y-axis direction and the length of the outer edges adjacent in the Z-axis direction in the first and second channels 62 and 64 each including a solid portion that is a material such as a resin material to form the fluid channel deforming portion 42. In the first embodiment, the first and second channels 62 and 64 are arranged alternately in the Y-axis and Z-axis directions to increase in their adjacent region.

The mixing channel 66 has a most upstream opening 66*a* (see FIG. 5) and a most downstream opening 66*b*. The most upstream opening 66*a* of the mixing channel 66 continues downstream from the first most downstream opening 62*b* of the first channel 62 and the second most downstream opening 64*b* of the second channel 64. The opening edge of the most upstream opening 66*a* of the mixing channel 66 is located outside all the openings of the first most downstream opening 62*b* of the first channel 62 and all the openings of the second most downstream opening 64*b* of the second channel 64. The downstream end portion 54 of the fluid controller 16 has an opening 66*b* of the mixing channel 66 into which the first and second channels 62 and 64 are integrated. The mixing channel 66 communicates with the most downstream opening 66*b* at the downstream end portion 54. Accordingly, the mixing portion 44 discharges a third fluid into which the first and second fluids are mixed, toward the downstream connector 32 of the downstream pipe 18.

Next, with reference to FIG. 2, a description will be given of changes in the arrangement and shape (relative position) of the first and second channels 62 and 64 between the upstream end portion 52 and the terminating portion 56 in the fluid channel deforming portion 42 of the fluid controller 16, and changes in the arrangement and shape of the mixing channel 66 between the channel terminating portion 56 of the fluid channel deforming portion 42 and the downstream end portion 54 of the mixing portion 44.

FIG. 2 shows cross-sections of the fluid controller 16 at each of the positions located at predetermined intervals and taken along the YZ plane between the upstream end portion 52 and channel terminating portion 56 of the fluid channel deforming portion 42 of the fluid controller 16. In the first embodiment, six cross-sections 72*a*, 72*b*, 72*c*, 72*d*, 72*e* and 72*f* are taken virtually at predetermined intervals between the end portions (end faces) 52 and 56 of the fluid channel deforming portion 42 of the fluid controller 16. These cross-sections 72*a*, 72*b*, 72*c*, 72*d*, 72*e* and 72*f* are parallel to the end portions (end faces) 52 and 56 and also parallel to the YZ plane.

The fluid channel deforming portion 42 of the fluid controller 16 includes five fluid channel sections A, B, C, D and E of different functions between the upstream end portion 52 and the channel terminating portion 56. The five fluid channel sections are an introduction section A, a branch section (first branch section) B, a cross-section deforming section C, a branch section (second branch section) D and a horizontal shift section E in order from upstream to downstream.

Two cross-sections 74*a* and 74*b* are taken virtually at predetermined intervals between the channel terminating portion 56 of the fluid channel deforming portion 42 of the fluid controller 16 and the downstream end portion 54 of the mixing portion 44. These cross-sections 74*a* and 74*b* are parallel to the end portions (end faces) 56 and 54 and also parallel to the YZ plane.

The mixing portion 44 of the fluid controller 16 includes two fluid channel sections F and G of different functions between the channel terminating portion 56 and the downstream end portion 54. These fluid channel sections are a mixing section F and a discharge section G in order from upstream to downstream.

In the sections A to E, the arrangement of the first and second channels 62 and 64, the fluid channel shape thereof, and the number thereof are gradually varied from upstream to downstream. Accordingly, the arrangement, fluid channel shape and number of the first and second channels 62 and 64 are gradually varied at each of the portions 52 and 56 and each of the cross-sections 72*a* to 72*f* between the portions 52 and 56. That is, the first and second channels 62 and 64 are gradually deformed between the upstream end portion 52 and the channel terminating portion 56.

Note that the first and second channels 62 and 64 preferably have substantially the same area (fluid passage area) in the cross-section along each YZ plane. In other words, it is preferable that the first and second channels 62 and 64 vary little in their channel area in the X-axis direction.

In the introduction section A defined from the upstream end portion 52 to the cross-section 72, a single first channel 62 is formed in an introduction path that is the upper half region of the upstream end portion 52 as shown in FIG. 2. A single second channel 64 is also formed in an introduction path that is the lower half region of the upstream end portion 52. The cross-section 72*a* includes channel walls of the first and second channels 62 and 64 (annular edge to form a fluid channel) which extend from the upstream end portion 52. The channel walls of the first and second channels 62 and 64 in the cross-section 72*a* are each substantially rectangular (quadrangular). In the cross-section 72*a*, the first and second channels 62 and 64 are arranged in two rows in the Z-axis direction like the first and second most upstream openings 62*a* and 64*a* of the upstream end portion 52.

As shown in FIG. 4, the first channel 62 has a step 62*c* between the first most upstream opening 62*a* of the upstream end portion 52 and the cross-section 72*a* of the section A. Thus, the area of the first channel 62 inside the cross-section 72*a* is larger than that of the first channel 62 inside the first most upstream opening 62*a*. Similarly, the second channel 64 has a step 64*c* between the second most upstream opening 64*a* of the upstream end portion 52 and the cross-section 72*a* of the section A. Thus, the area of the second channel 64 inside the cross-section 72*a* is larger than that of the second channel 64 inside the second most upstream opening 64*a*.

Note that the first most upstream opening 62*a* of the upstream end portion 52 may be branched into a plurality of openings. Whether the upstream end portion 52 includes a single or a plurality of first most upstream openings 62*a*, the total sum of the inside areas (channel areas) of the first most upstream openings 62*a* of the upstream end portion 52 is smaller than that of the channel areas of the first channel 62 at the most downstream position of the introduction section A.

Similarly, the first most upstream opening 64*a* of the upstream end portion 52 may be branched into a plurality of openings. Whether the upstream end portion 52 includes a single or a plurality of second most upstream openings 624, the sum of the inside areas (channel area) of the second most upstream openings 64*a* of the upstream end portion 52 is smaller than that of the channel areas of the second channel 64 at the most downstream position in the introduction section A.

As shown in FIG. 2, in the branch section B defined from the cross-section 72*a* to the cross-section 72*b*, the first and second channels 62 and 64 each have a single opening in the cross-section 72*a*, but change to have three smaller rectangular openings in the cross-section 72*b*. In the branch section B, therefore, the first and second channels 62 and 64 are branched into two rows in the Z-axis direction in the cross-section 72*a*, and branched into two rows in the Z-axis direction and three rows in the Y-axis direction in the cross-section 72*b*. That is, the first and second channels 62 and 64 are branched between the upstream end portion 52 and the channel terminating portion 56 in the branch section. B.

In the cross-section deforming section C defined from the cross-section 72*b* to the cross-section 72*c*, the first and second channels 62 and 64 change in shape from a rectangle to an elongated triangle from the cross-section 72*b* to the cross-section 72*c*. The first and second channels 62 and 64 change in shape from an elongated triangle to a narrow rectangle from the cross-section 72*c* to the cross-section 72*d*.

Between the cross-sections 72*b* and 72*c* in the first half of the section C, the arrangement of 2×3 in which three rectangular flow paths of the first channel 62 are arranged in the upper stage and three rectangular flow paths of the second channel 64 are arranged in the lower stage, is changed to the arrangement in which three elongated inverted triangular flow paths of the first channel 62 and three elongated triangular flow paths of the second channel 64 are alternately arranged side by side in the Y-axis direction. More specifically, the lower vertexes of the inverted triangular flow paths of the first channel 62 are inserted between two triangular flow paths of the second channel 64 and the upper vertexes of the triangular flow paths of the second channel 64 are inserted between two inverted triangular flow paths of the first channel 62. In the cross-section 72*c*, therefore, the triangular flow paths of the first and second channels 62 and 64 as a whole are changed to be arranged side by side in the Y-axis direction.

Between the cross-sections 72*c* and 72*d* in the next section to the cross-section deforming section C, the arrangement in which six triangular flow paths of the first and second channels 62 and 64 are arranged is changed to the arrangement in which six narrow rectangular flow paths of the first and second channels 62 and 64 are arranged side by side in the Y-axis direction. More specifically, three narrow rectangular flow paths of the first channel 62 and three narrow rectangular flow paths of the second channel 64 are alternately arranged side by side in the Y-axis direction.

As described above, in the cross-section deforming section C, the first and second channels 62 and 64 are deformed from the state of the cross-section 72*b* in which the flow paths of the first channel 62 are present on the upper side and the flow paths of the second channel 64 are present on the lower side in the Z-axis direction to the state of the cross-section 72*d* in which the first and second channels 62 and 64 are arranged alternately in the Y-axis direction.

In the branch section D defined from the cross-section 72*d* to the cross-section 72*e*, the first and second channels 62 and 64 are changed in arrangement and shape from the state of the cross-section 72*d* in which the flow paths of the first and second channels 62 and 64 are rectangular and arranged in six rows in the Y-axis direction to the state of the cross-section 72*e* in which the first and second channels 62 and 64 are branched into small square channels in the Z-axis direction and the small square channels are arranged in six rows in vertical and horizontal directions (Y-axis and Z-axis directions). That is, each of the first channel 62 and second channel 64 is branched into three flow paths in the branch section B, and each of the three flow paths is further branched into six flow paths in the branch section D, and the six flow paths are arranged in the Z-axis (vertical) direction. Therefore, the first and second channels 62 and 64 are branched into a plurality of flow paths (channels) in the branch section D between the upstream end portion 52 and the channel terminating portion 56.

Between the cross-sections 72*e* and 72*f*, in the horizontal shift section E defined from the cross-section 72*e* to the channel terminating portion (channel interface) 56, the six small square flow paths of the first and second channels 62 and 64 of each of the first, third and fifth rows are shifted to the left (e.g. +(plus) side) in the Y-axis (horizontal) direction when viewed from upstream to downstream in FIG. 2, and the small square flow paths of the first and second channels 62 and 64 of each of the second, fourth and sixth rows are shifted to the right (e.g. – (minus) side) in the Y-axis (horizontal) direction when viewed from upstream to downstream in FIG. 2.

Between the cross-sections 72*f* and the channel terminating portion 56 in the horizontal shift section E, the six small square flow paths of the first and second channels 62 and 64 of each of the first, third and fifth rows are shifted further to the left in the Y-axis (horizontal) direction when viewed from upstream to downstream in FIG. 2, and the small square flow paths of the first and second channels 62 and 64 of each of the second, fourth and sixth rows are shifted further to the right in the Y-axis (horizontal) direction when viewed from upstream to downstream in FIG. 2. In the first embodiment, at the channel terminating portion 56, the first most downstream opening 62*b* of the first channel 62 and the second most downstream opening 64*b* of the second channel 64 are alternately arranged in the Y-axis direction and also alternately arranged in the Z-axis direction.

FIG. 3 shows the first most downstream openings 62*b* of the first channel 62 and the second most downstream openings 64*b* of the second channel 64 in the channel terminating portion 56.

As shown in FIG. 3, some of the flow paths of the second channel 64 are present in a region imaginary connecting any closest pair of the flow paths i.e. a certain first channel 62 and its closest first channel 62, between the channel terminating portion 56 and the cross-section 72*f* of the shift section E that is a cross-section perpendicular to the extending direction of the first and second channels 62 and 64 of the fluid channel deforming portion 42. In contrast, some of the flow paths of the first channel 62 are present in a region imaginary connecting any closest pair of the flow paths i.e. a certain second channel 64 and its closest second channel 64.

Between the channel terminating portion 56 and the cross-section 72*f* of the shift section E, there are flow paths of the first channel 62 or second channels 64 in all directions with respect to any one of the first channel 62 in a cross-section perpendicular to the extending direction of the first and second channels 62 and 64 of the fluid channel deforming portion 42. There are flow paths of the second channel 64 above and below any one of the first channel 62 in the Z-axis direction. There are flow paths of the second channel 64 on the right and left of any one of the first channel 62 in the Y-axis direction. There is a first channel 62 in each of the directions inclined 45°, 135°, 225° and 315° to the Y axis of any one of the first channel 62.

Although not limited, it is preferable that the first and second channels 62 and 64 of the first embodiment each have a channel area that is smaller than a channel area that affects the surface tension of fluids flowing through the fluid controller 16.

When the average perimeter of one channel wall of the cross-sections of the first and second channels 62 and 64 is L and the average area of the inside of the one channel wall is S, the following equation is given:

$$D=4*S/L$$

The equivalent diameter D of a channel wall (annular edge) given by the above equation is preferably 1 μm or longer and 10 mm or shorter. When the inside of one channel wall of the first and second channels 62 and 64 is circular and the diameter thereof is shorter than 1 μm, it may be difficult to fabricate and a pressure loss to a fluid flowing through the fluid controller 16 may increase significantly. On the other hand, when the diameter is longer than 10 mm, for example, a distance between the first and second channels 62 and 64 may increase to lower the performance of mixture of fluids.

Note that the channel area of the inside of the first most upstream opening 62*a* is smaller than the total inside area (total channel area) of the first channel 62 in an appropriate cross-section between the cross-section 72*b* and the channel terminating portion 56 after the first channel 62 of the channel deforming portion 42 is branched appropriately. Similarly, the channel area of the inside of the second most upstream opening 64*a* is smaller than the total inside area (total channel area) of the second channel 64 in an appropriate cross-section between the cross-section 72*b* and the channel terminating portion 56 after the second channel 64 of the channel deforming portion 42 is branched appropriately.

The mixing portion 44 takes two cross-sections 74*a* and 74*b* of the mixing channel 66 in the mixing section F defined from the channel terminating portion (channel interface) 56 of the fluid channel deforming portion 42 to the cross-section 74*b* of the mixing portion 44. The mixing channel 66 is shaped and arranged so as to extend from upstream to downstream in substantially the same state. Between the channel terminating portion 56 and the cross-section 74*a* and between the cross-sections 74*a* and 74*b*, the arrangement and shape of the mixing channel 66 is maintained in a constant state.

In the mixing section F, the first and second channels 62 and 64 are changed from the shape and arrangement of the channel terminating portion 56 in which they are shaped like small square channels and arranged in six rows and six columns to the shape and arrangement of the cross-section 74*a* in which the first and second channels 62 and 64 are mixed into a single rectangular mixing channel 66. Between the cross-sections 74*a* and 74*b* in the mixing section F, the single rectangular mixing channel 66 does not change in its shape, arrangement and size.

In the discharge section G defined from the cross-section 74*b* of the mixing portion 74 to the downstream end portion 54, the mixing channel 66 extends from upstream to downstream in substantially the same state. Thus, in the discharge section G between the cross-section 74*b* and the channel terminating portion 56, the number of rectangular mixing channel 66 does not vary. On the other hand, the size of the mixing channel 66 varies in the discharge section G.

As shown in FIG. 5, the mixing channel 66 has a step 66*c* between the cross-section 74*b* in the section G and the downstream end portion 54. In the mixing channel 66, the channel area of the mixing channel 66 inside the most downstream opening 66*b* is smaller than that of the mixing channel 66 inside the cross-section 74*b*.

That is, the inside area of the mixing channel 66 in one cross-section 74*a* perpendicular to the extending direction of the mixing channel 66 in the mixing section F of the mixing portion 44 is larger than that of the third most downstream opening 66*b* in the discharge section G.

FIG. 4 shows a state in which the upstream pipes 12 and 14 are attached to the upstream end portion 52 of the fluid controller 16. FIG. 5 shows a state in which the downstream pipe 18 is attached to the downstream end portion 54 of the fluid controller 16.

As shown in FIG. 4, between the upstream pipes (introduction pre-stage portions) 12 and 14 and the fluid channel deforming portion 42, the fluid mixer 10 has a sealing mechanism 82 for connecting them. The sealing mechanism 82 prevents a fluid passing through the tube (first pipe) 22 of the upstream pipe 12 and a fluid channel 26*a* of the upstream connector 24 from leaking to the upstream connector 24 of the upstream pipe 14 in the upstream connector 24 of the upstream pipe 12. Similarly, the sealing mechanism 82 prevents a fluid passing through the tube (second pipe) 22 of the upstream pipe 14 and a fluid channel 26*b* of the upstream connector 24 from leaking to the upstream connector 24 of the upstream pipe 12 in the upstream connector 24 of the upstream pipe 14. The sealing mechanism 82 is formed of, for example, an O-ring-shaped rubber material depending on a fluid flowing through the fluid mixer 10.

In the upstream end portion 52, the fluid channel area of each of the channels 62 and 64 needs to be smaller than the cross-section 72*a* because an area for the sealing mechanism 82 is required. In other words, the cross-section 72*a*, which is downstream from the upstream end portion 52, includes no sealing mechanism, and thus the fluid channel area of each of the first and second channels 62 and 64 in the cross-section 72*a* can be larger than that in the upstream end portion 52. In the introduction section A of the fluid channel deforming portion 42, the inside fluid channel area of each of the first and second channels 62 and 64 gradually increases from the upstream end portion 52 to its downstream cross-section 72*a*. In the introduction section A of the fluid channel deforming portion 42, the fluid channel area of each of the first and second channels 62 and 64 may gradually increase from the upstream end portion 52 to its downstream cross-section 72*a* regardless of the steps 62*c* and 64*c*.

The sealing mechanism 82 is not required when the upstream connector 24 of the upstream pipe (introduction pre-stage portion) 12 and the first channel 62 can, for example, be molded integrally as one unit to prevent a first fluid from leaking from between them and the upstream connector 24 of the upstream pipe (introduction pre-stage portion) 14 and the second channel 64 can, for example, be molded integrally as one unit to prevent a second fluid from leaking from between them. When the sealing mechanism 82 is not required, the upstream end portion 52 and the cross-section 72*a* may have the same inside fluid channel area of the first channel 62 and may have the same inside fluid channel area of the second channel 64.

Like the sealing mechanism 82 between the upstream pipes 12 and 14 and the upstream end portion 52 of the fluid controller 16 shown in FIG. 4, the fluid mixer 10 includes a sealing mechanism 84 between the downstream pipe 18 and the downstream end portion 54 of the fluid controller 16 shown in FIG. 5. The sealing mechanism 84 prevents a fluid flowing through the downstream connector 32 of the downstream pipe 18 and the tube 34 from leaking from the downstream connector 32 of the downstream pipe 18. The sealing mechanism 84 is formed of, for example, an O-ring-shaped rubber material depending on a fluid flowing through the fluid mixer 10.

In the downstream end portion 54, the fluid channel area of the mixing channel 66 needs to be smaller than the cross-section 74*b* because an area for the sealing mechanism 84 is required. In other words, the cross-section 74*b*, which is upstream from the downstream end portion 54, includes no sealing mechanism, and thus the fluid channel area of the mixing channel 66 in the cross-section 74*b* can be larger than that in the downstream end portion 54. In the section G of the mixing portion 44, the inside fluid channel area of the mixing channel 66 gradually decreases from the cross-section 74*b* to the downstream end portion 54. In the section G of the mixing portion 44, the inside fluid channel area of the mixing channel 66 may gradually decrease from the cross-section 74*b* to the downstream end portion 54 regardless of the step 66*c*.

The sealing mechanism 84 is not required when the downstream connector 32 of the downstream pipe (discharge post-stage portion) 18 and the mixing channel 66 can, for example, be molded integrally as one unit to prevent a third fluid from leaking from between them. When the sealing mechanism 84 is not required, the downstream end portion 54 and the cross-section 74*b* may have the same inside fluid channel area of the mixing channel 66.

The channels 62 and 64 for two fluids divided at an inlet portion of the fluid controller 62 are adjacent to each other in a plurality of directions perpendicular to the direction in which the fluids flow through a through fluid channel in a certain direction. The first and second fluids flow in parallel to each other as shown in FIG. 2. The most downstream openings 62*b* and 64*b* may have the same size, shape and number or different sizes, shapes and numbers, depending on the viscosity of the fluid and the like.

The operation of the fluid mixer 10 of the first embodiment will be described below.

The first channel 62 is supplied with a first fluid at a desired pressure from a first fluid supply source (not shown) through the tube 22 of the upstream pipe 12 and the upstream connector 24. The second channel 64 is supplied with a second fluid at a desired pressure from a second fluid supply source (not shown) through the tube 22 of the upstream pipe 14 and the upstream connector 24.

The fluid mixer 10 causes the first fluid to flow in one direction through the tubes 22 of the upstream pipes 12 and 14 and the upstream connector 24 and through the first channel (fluid channel group) 62 in the fluid channel deforming portion 42 of the fluid controller 16. The fluid mixer 10 also causes the second fluid to flow in one direction through the second channel (fluid channel group) 64 in parallel to the first fluid. Then, the fluid mixer 10 mixes the first and second fluids in the mixing channel 66 of the mixing portion 44 to generate a third fluid, and causes the third fluid to flow in one direction through the mixing channel 66. The fluid mixer 10 causes the third fluid to flow downstream through the downstream connector 32 of the downstream pipe 18 and the tube 34.

In the first embodiment, the most downstream opening 62*b* of the first channel 62 belonging to the first fluid channel group and the most downstream openings 64*b* of the second channel 64 belonging to the second fluid channel group are adjacent to each other in the channel terminating portion 56 at the boundary between the fluid channel deforming portion 42 and the mixing portion 44. For example, around one most downstream opening 62*b* of the first channel 62, there are other most downstream openings 62*b* of the first channel 62 and a plurality of most downstream openings 64*b* of the second channel 64. For this reason, in the channel terminating portion 56 that is a certain cross-section perpendicular to the flow direction of the fluid controller 16, one fluid channel (e.g. first channel 62) includes a fluid channel for causing the first fluid to flow through the first channel 62 and channels 62 and 64 for causing a second fluid to flow through the second channel 64 in all directions with respect to an optional point on the channels 62 and 64 64, as shown in FIG. 3. That is, the flow paths of the first channel 62 or the flow paths of the second channel 64 exist in all directions with respect to any one of the flow paths of the first channel 62 in the certain cross-section of the fluid channel deforming portion 42. In the channel terminating portion 56, therefore, the openings 62*b* of the first channel 62 and the openings 64*b* of the second channel 64 are made close to each other, and there are a plurality of (a number of) short distances from the openings 62*b* of the first channel 62 to the openings 64*b* of the second channel 64. Thus, the first fluid is caused to flow into the first channel 62 and supplied into the mixing channel 66 through the openings 62*b*, and the second fluid is caused to flow into the second channel 64 and supplied into the mixing channel 66 through the openings 64*b*. The first and second fluids are mixed together in the mixing channel 66.

In the example of the channel terminating portion 56 (one cross-section perpendicular to the flow direction of the fluid controller 16) shown in FIG. 3, there are 18 rectangular most downstream openings 62*b* of the first channel 62 and 18 rectangular most downstream openings 64*b* of the second channel 64. Accordingly, the number of sides of the most downstream openings 62*b* is 72 and so is the number of sides of the most downstream openings 64*b*. Assume that each of the most downstream openings 62*b* and 64*b* is square. The number of sides (boundary portions) of the most downstream openings 62*b*, which are adjacent to the sides (boundary portions) of the most downstream openings 64*b* in the Y-axis and Z-axis directions, is 55. The number "55" corresponds to the total length of the boundary portions and is not less than ¾ of "72" which is the length of all sides of the most downstream openings 64*b* of the second channel 64. The number of sides of the first and second channels 62 and 64, which are adjacent to each other in the Y-axis and Z-axis directions, has only to be about ½ of the total number of sides, depending on the embodiment.

In the upstream end portion 52 shown in FIG. 2, there is one rectangular most upstream opening 62*a* of the first channel 62, and there is one rectangular most upstream opening 64*a* of the second channel 64. Accordingly, the number of sides of each of the most upstream openings 62*a* and 64*a* is four. Assume that the most upstream openings 62*a* and 64*a* are each square. The number of sides (boundary portions) of the most upstream opening 62*a*, which are adjacent to the sides (boundary portions) of the most upstream opening 64*a* in the Y-axis and Z-axis directions, is one. The number "1" corresponds to the total length of the boundary portions and is ¼ of "4" which is the length of all sides of the most downstream openings 64*b* of the second channel 64, and "1" is smaller than ½.

That is, in the first embodiment, the relative shape of the cross-sections 72*a* to 72*f* between the portions 52 and 56 of the channels 62 and 64 is varied in a two-dimensional projected plan view to increase an adjacent region between the first and second channels 62 and 64 toward the downstream direction. That is, the openings 62*b* and 64*b* are dispersed such that the fluids discharged from the openings 62*b* and 64*b* are easily mixed with each other in the channel terminating portion 56. Therefore, the fluids are mixed easily in the mixing portion 44 on the downstream side of the channel terminating portion 56 as compared with the case where the channels 62 and 64 are adjacent only in one direction as in the upstream end portion 52.

As described above, in the first embodiment, the "adjacent region" refers to the length of the outer edges adjacent in the Y-axis direction and the length of the outer edges adjacent in the Z-axis direction in the first and second channels 62 and 64 each including a solid portion that is a material such as a resin material to form the fluid channel deforming portion 42. In the first embodiment, the outer edges are defined as sides in each of the cross-sections 72*a*, 72*b*, 72*c*, 72*d*, 72*e* and 72*f*.

Compare the sizes of adjacent regions of the first channel 62 including fluid channel group and the second channel 64 including fluid channel group in the cross-sections from the cross-section 72*a* and to the channel terminating portion 56, for example. In the cross-sections 72*a* and 72*b*, only the number of divisions of the first and second channels 62 and 64 changes and their adjacent region does not substantially change. In the cross-sections 72*b* and 72*c*, the adjacent region of the first and second channels 62 and 64 in the cross-section 72*c* is larger than that of the first and second channels 62 and 64 in the cross-section 72*b*. Similarly, when the cross-sections 72*c* and 72*d* are compared, the outer edges adjacent in the Y-axis direction and the outer edges adjacent in the Z-axis direction in the upstream first and second channels 62 and 64 are longer than those in the downstream first and second channels 62 and 64, namely, the adjacent regions gradually increase. As in the case where the cross-sections 72*a* and 72*b* are compared, when the cross-sections 72*d* and 72*e* are compared, only the number of divisions of the first and second channels 62 and 64 changes and the adjacent region does not substantially change. When the cross-sections 72*e* and 72*f* are compared and the cross-section 72*f* and the channel terminating portion 56 are compared, the outer edges adjacent in the Y-axis direction and the outer edges adjacent in the Z-axis direction in the downstream first and second channels 62 and 64 are longer than those in the upstream first and second channels 62 and 64, namely, the adjacent regions gradually increase. In the fluid channel deforming portion 42, the adjacent regions of the first and second channels 62 and 64 increase toward downstream from upstream.

In the channel terminating portion 56, the flow rate of the first and second fluids discharged from each of the openings 62*b* and 64*b* is lower than that of fluids discharged from one opening in the first and second channels 62 and 64 in sections A-C. According to the flow rate conservation law, however, the total flow rate of first and second fluids is constant in each YZ cross-section between the upstream end portion (upstream end face) 52 and channel terminating portion 56 of the fluid controller 16. The total inside fluid channel areas of the first channel 62 in the YZ planes between the most upstream opening 62*a* and the most downstream opening 62*b*, i.e., the aperture ratio hardly changes. In addition, the total inside fluid channel areas of the second channels 64 in the YZ planes between the most upstream opening 64*a* and the most downstream opening 64*b*, i.e., the aperture ratio hardly changes. Thus, when the first fluid is caused to flow into the first channel 62 and when the second fluid is caused to flow into the second channel 64, a pressure loss to these fluids is prevented from increasing.

In the mixing section F of the mixing portion 44, the fluids are easily mixed to reduce the time and distance required for uniform mixture of the fluids. Therefore, the use of the fluid controller 16 improves the performance of mixture of the first and second fluids while decreasing the length of the mixing portion 44.

As described above, the following can be attained from the fluid mixer 10 according to the first embodiment.

According to the first embodiment, in at least one cross-section perpendicular to the flow direction of the fluid channel deforming portion 42 of the fluid controller 16, channels 62 and 64 through which a second fluid other than a first fluid flows can be provided, for example, on at least one segment connecting any closest fluid channel pair through which the first fluid flows. The fluid controller 16 is so configured that the first and second channels 62 and 64 are adjacent in multiple directions in the channel terminating portion 56 of the fluid channel deforming portion 42 before the mixing portion 44 that generates a third fluid by mixing the first and second fluids. In addition, the aperture ratio can be made substantially constant from the upstream end portion 52 to the channel terminating portion 56 of the fluid controller 16. Therefore, for example, the channels 62 and 64 whose shape and size correspond to those of the most upstream openings 62*a* and 64 of the upstream end portion 52 continue from the upstream end portion 52 to the channel terminating portion 56, and are adjacent only in one direction of the Z-axis direction. As compared with the case where a large number of fluids are directly mixed, the fluid controller 16 of the first embodiment can reduce time and distance required for uniform mixture of fluids because the fluid controller 16 is so configured to bring a small number of fluids into contact with each other and mix them in the mixing portion 44 with the flow rate as a whole the same from the upstream end portion 52 to the channel terminating portion 56. The use of the fluid controller 16 can thus improve the performance of mixture of a plurality of fluids with the mixing portion 44 short.

According to the first embodiment, an excess thick portion other than the regions where the channels 62 and 64 are formed can be reduced in the fluid channel deforming portion 42 of the fluid controller 16. The fluid controller 16 can thus be decreased in size with the aperture ratio constant between the upstream end portion 52 and the channel terminating portion 56. Since, furthermore, the fluid controller 16 can be fabricated by the foregoing method, the fluid mixer 10 as a whole can be decreased in size.

As can be seen from the above, the first and second channels 62 and 64 are deformed from the fluid channel deforming portion 42 to the mixing portion 44 to mix the first and second fluids with efficiency into a third fluid when the first and second fluids are discharged.

In all the cross-sections perpendicular to the flow direction of the fluid channel deforming portion 42, the flow directions of all the channels 62 and 64 can be aligned with each other. In other words, the flow directions of all the channels 62 and 64 can be unchanged from the inlet (upstream end portion 52) to the outlet (channel terminating portion 56) of the fluid channel deforming portion 42. The use of the fluid controller 16 can thus prevent a pressure loss to the first and second fluids from increasing.

When a region for arranging the sealing mechanisms 82 and 84 is provided at the inlet of the fluid channel deforming portion 42 or the outlet of the mixing portion 44, the upstream pipes 12 and 14 and the fluid controller 16 can be connected to each other without leakage of fluids, as can be the fluid controller 16 and the downstream pipe 18.

Note that the fluid controller 16 is preferably molded integrally with the upstream connector 24 of the upstream pipes 12 and 14. In this case, the sealing mechanism 82 is not required. The fluid controller 16 is also preferably molded integrally with the downstream connector 32 of the downstream pipe 18. In this case, the sealing mechanism 84 is not required.

According to the first embodiment described above, in the channel terminating portion 56 shown in FIG. 3 as one cross-section of the fluid channel deforming portion 42 of the fluid controller 16, the total length of boundary portions of the most downstream openings 62*b* of the first channel 62, which are adjacent to the most downstream openings 64*b* of the second channel 64 is not less than ½ of the total length of sides of the most downstream openings 64*b* of the second channel 64. The most downstream openings 62*b* of the first channel 62 or the most downstream openings 64*b* of the second channel 64 need not be rectangular. For example, in one cross-section perpendicular to the extending direction of the first and second channels 62 and 64 of the fluid channel deforming portion 42, the ratio of the total length of the sides along one of the cross-sections of the second channel 64 and adjacent to the sides (fluid channel walls) of the first channel 62 to the total length of the sides along one of the cross-sections of the first channel 62 has only to be 1/2 or more. As described above, the term "adjacent" means that for example, the fluid channel walls of the first channel 62 and those of the second channel 64 have only to be adjacent to each other in the Y-axis and Z-axis directions. Accordingly, one of the fluid channel walls of the first and second channels 62 and 64 may be circular.

The first embodiment is directed to an example in which both the first and second channels 62 and 64 are deformed gradually between the upstream end portion 52 and the channel terminating portion 56. The first channel 62 or the second channel 64 may be deformed gradually between them. In other words, at least the first channel 62 or the second channel 64 may be deformed gradually between them.

As described above, the first embodiment provides a fluid controller 16 with high mixing efficiency and a fluid mixer 10 including the fluid controller 16.

In the fluid mixer 10 of the first embodiment, it is necessary to cause a fluid to flow from the upstream pipe 12 into the first channel 62 with reliability and to cause a fluid to flow from the upstream pipe 14 into the second channel 64 with reliability. It is therefore necessary to cause the upstream pipe 12 and the first channel 62 to reliably communicate with each other and cause the upstream pipe 14 and the second channel 64 to reliably communicate with each other.

(Fluid Channel Connection Confirmation Configuration of Upstream Connector 24 and Fluid Controller 16)

FIGS. 6 through 9 are cross-sectional views taken along line VI-VI of the upstream connection portion 24 shown in FIG. 4.

Figure 6:
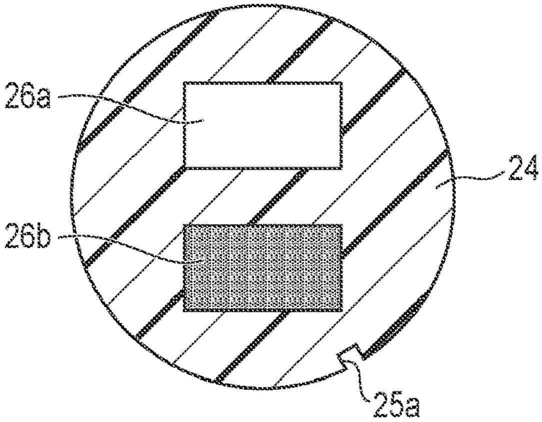
FIG. 6 is an example of a cross-sectional view taken along line VI-VI of an upstream connection in FIG. 4.

In the example shown in FIG. 6, the outer edge of the upstream connector 24 is, for example, circular. A notch 25*a* is formed in the outer edge of the upstream connector 24. The fluid controller 16 to which the upstream connector 24 is connected is provided with an index (not shown) that is aligned with the notch 25*a*. From the positions of the notch 25*a* and the index, a user can recognize that the fluid channel 26*a* of the upstream pipe 12 communicates with the first channel 62 and the fluid channel 26*b* of the upstream pipe 14 communicates with the second channel 64.

Figure 7:
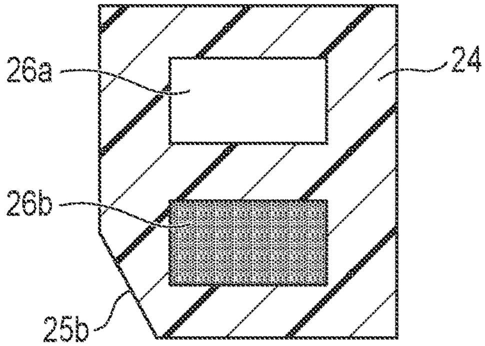
FIG. 7 is a modification to the cross-sectional view taken along line VI-VI of the upstream connection in FIG. 4.

In the example shown in FIG. 7, the outer edge of the upstream connector 24 is, for example, substantially rectangular. A notch 25*b* is formed in the outer edge of the upstream connector 24. As in the example shown in FIG. 6, when the notch 25*b* is aligned with an index (not shown)

provided in the fluid controller 16, a user can recognize that the fluid channel 26*a* of the upstream pipe 12 communicates with the first channel 62 and the fluid channel 26*b* of the upstream pipe 14 communicates with the second channel 64. An example of the index is, for example, to make the outside shape of the notch 25*b* of the upstream connector 24 flush with that of the fluid controller 16.

Figure 8:
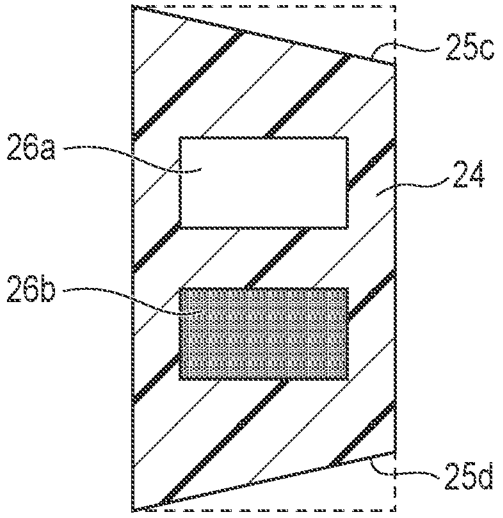
FIG. 8 is a modification to the cross-sectional view taken along line VI-VI of the upstream connection in FIG. 4.

In the example shown in FIG. 8, the outer edge of the upstream connector 24 is, for example, substantially rectangular. Notches 25*c* and 25*d* are formed in the outer edge of the upstream connector 24. The notch 25*c* is formed in a downward-sloping direction to the right on the upper side of the sheet of FIG. 8. The notch 25*d* is formed in an upward-sloping direction to the right on the lower side of the sheet of FIG. 8. As in the example shown in FIG. 6, when the notches 25*c* and 25*d* are aligned with an index (not shown) provided in the fluid controller 16, a user can recognize that the fluid channel 26*a* of the upstream pipe 12 communicates with the first channel 62 and the fluid channel 26*b* of the upstream pipe 14 communicates with the second channel 64. An example of the index is, for example, to make the outside shape of the notches 25*c* and 25*d* of the upstream connector 24 flush with that of the fluid controller 16.

Figure 9:
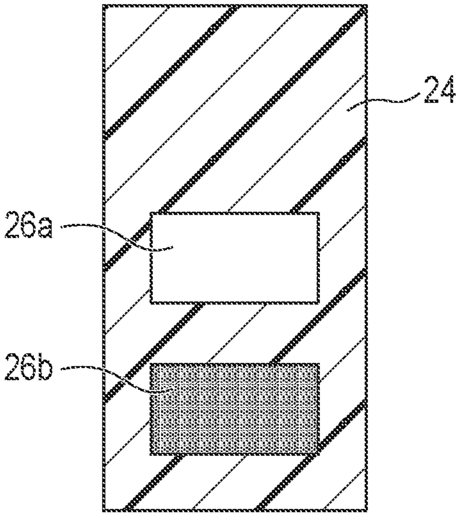
FIG. 9 is a modification to the cross-sectional view taken along line VI-VI of the upstream connection in FIG. 4.

In the example shown in FIG. 9, the outer edge of the upstream connector 24 is, for example, substantially rectangular. The fluid channels 26*a* and 26*b* are formed on the lower side than those in FIG. 8. The upstream connector 24 is prevented from being shifted in attaching position from the fluid controller 16, for example, by biasing the outside shape of the fluid controller 16 and the positions of the most upstream openings 62*a* and 64*a* of the first and second channels 62 and 64 as in the example shown in FIG. 8.

(Connection Configuration of Upstream Pipes 12 and 14, Fluid Controller 16 and Downstream Pipe 18 of Fluid Mixer 10)

A configuration for connecting the upstream pipes 12 and 14, fluid controller 16 and downstream pipe 18 of the fluid mixer 10 will be described with reference to FIG. 10.

Figure 10:
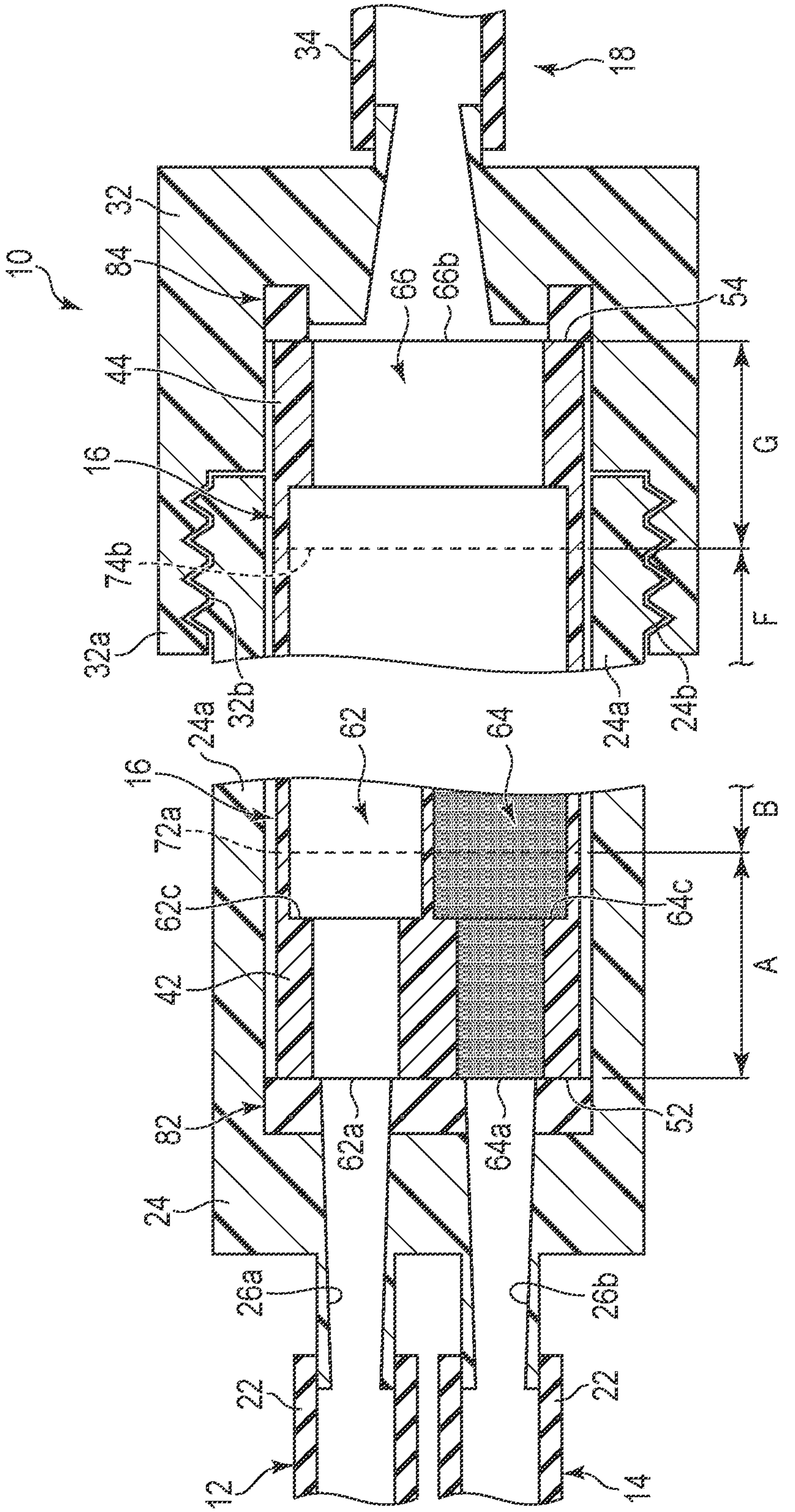
FIG. 10 is a schematic cross-sectional view showing a configuration for connecting the upstream pipe, fluid controller and downstream pipe of the fluid mixer.

FIG. 10 shows a configuration for connecting the upstream and downstream connectors 24 and 32 to the fluid controller 16.

As shown in FIG. 10, the upstream connector 24 has an extension 24*a* in the interior of the fluid controller 16. The extension 24*a* extends from the upstream end portion 52 of the fluid controller 16 to the outside of the mixing portion 44 of the fluid controller 16. A male thread 24*b* is formed on the outer periphery of the downstream end portion of the extension 24*a*.

The downstream connector 32 has an extension 32*a* including the male thread 24*b* of the upstream connector 24. The extension 32*a* extends from the downstream end portion 54 of the fluid controller 16 to the outside of the mixing portion 44 of the fluid controller 16. A female thread 32*b* is formed on the outer periphery of the extension 32*a*.

The male thread 24*a* of the upstream connection part 24 is screwed into the female thread 32*b* of the downstream connector 32. Thus, the upstream pipes 12 and 14, fluid controller 16 and downstream pipe 18 of the fluid mixer 10 are connected by the upstream and downstream connectors 24 and 32. This screw structure makes it possible to press the sealing mechanism 82 on the upstream connector 24 and the fluid controller 16 and also press the sealing mechanism 84 on the fluid controller 16 and the downstream connector 32.

Another configuration for connecting the upstream pipes 12 and 14, fluid controller 16 and downstream pipe 18 of the fluid mixer 10 will be described with reference to FIG. 11.

Figure 11:
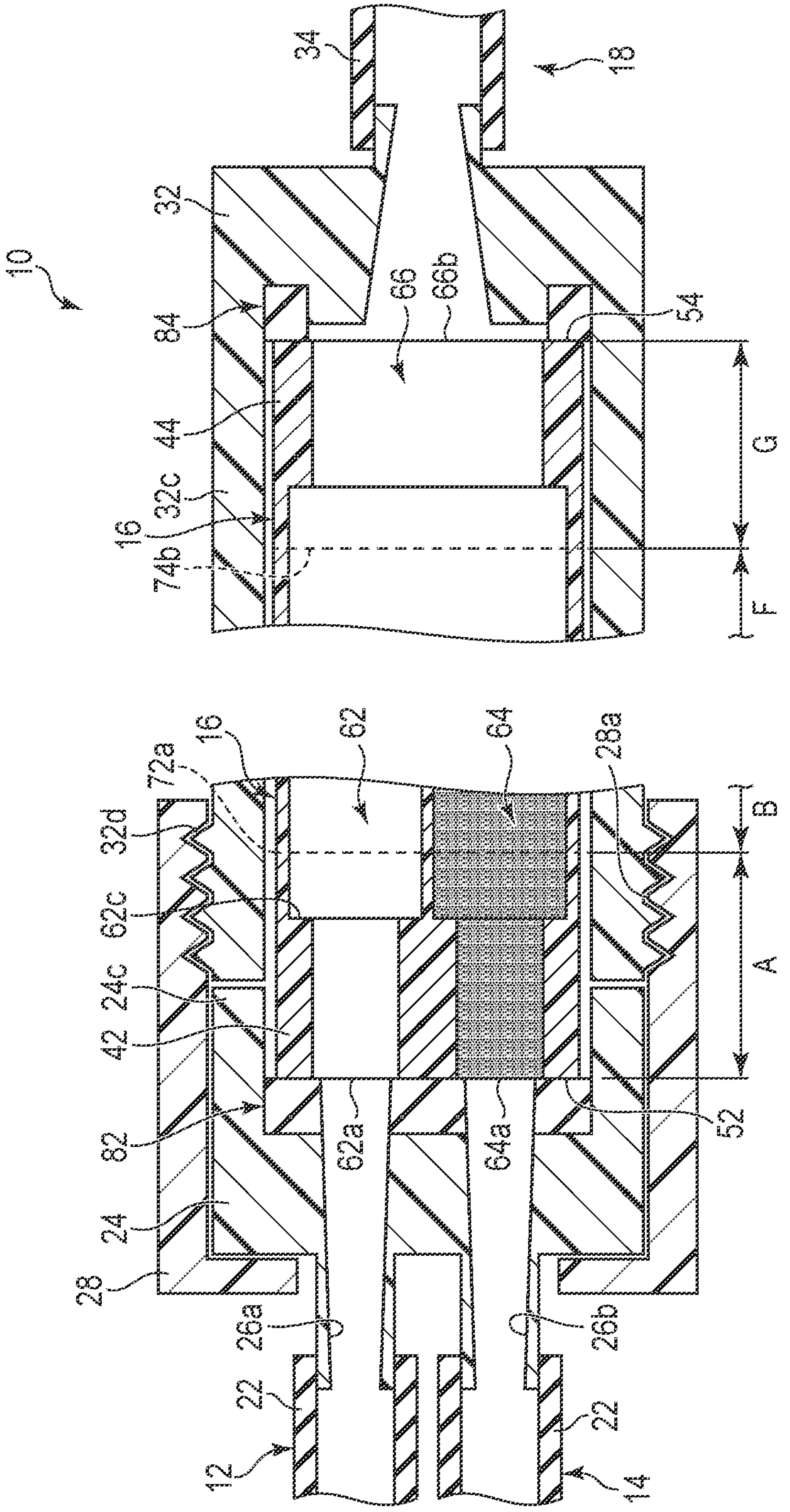
FIG. 11 is a modification to the schematic cross-sectional view showing a configuration for connecting the upstream pipe, fluid controller and downstream pipe of the fluid mixer.

FIG. 11 shows another configuration for connecting the upstream and downstream connectors 24 and 32 to the fluid controller 16.

As shown in FIG. 11, the upstream connector 24 has an extension 24*c* in the interior of the fluid controller 16. The extension 24*c* extends from the upstream end portion 52 of the fluid controller 16 to the outside of the introduction section A of the fluid channel deforming portion 42 of the fluid controller 16.

The downstream connector 32 has an extension 32*c*. The extension 32*c* extends from the downstream end portion 54 of the fluid controller 16 to the outside of the introduction section A of the fluid channel deforming portion 42 of the fluid controller 16. A male thread 32*d* is formed on the outer periphery of the extension 32*c*.

A cap 28 is provided outside the upstream connector 24 to cover the upstream connector 24. A female thread 28*a* is formed on the inner periphery of the cap 28.

The male thread 32*d* of the downstream connector 32 is screwed into the female thread 28*a* of the cap 28. Thus, the upstream pipes 12 and 14, fluid controller 16 and downstream pipe 18 of the fluid mixer 10 are connected by the upstream and downstream connectors 24 and 32. The cap 28 makes it possible to press the sealing mechanism 82 on the upstream connector 24 and the fluid controller 16 with the upstream connector 24 and the fluid channel of the fluid controller 16 aligned with each other. It also makes it possible to press the sealing mechanism 84 on the fluid controller 16 and the downstream connector 32.

(Modification to Mixing Portion 44)

A modification to the mixing portion 44 of the fluid controller 16 of the fluid mixer 10 will be described with reference to FIG. 12.

Figure 12:
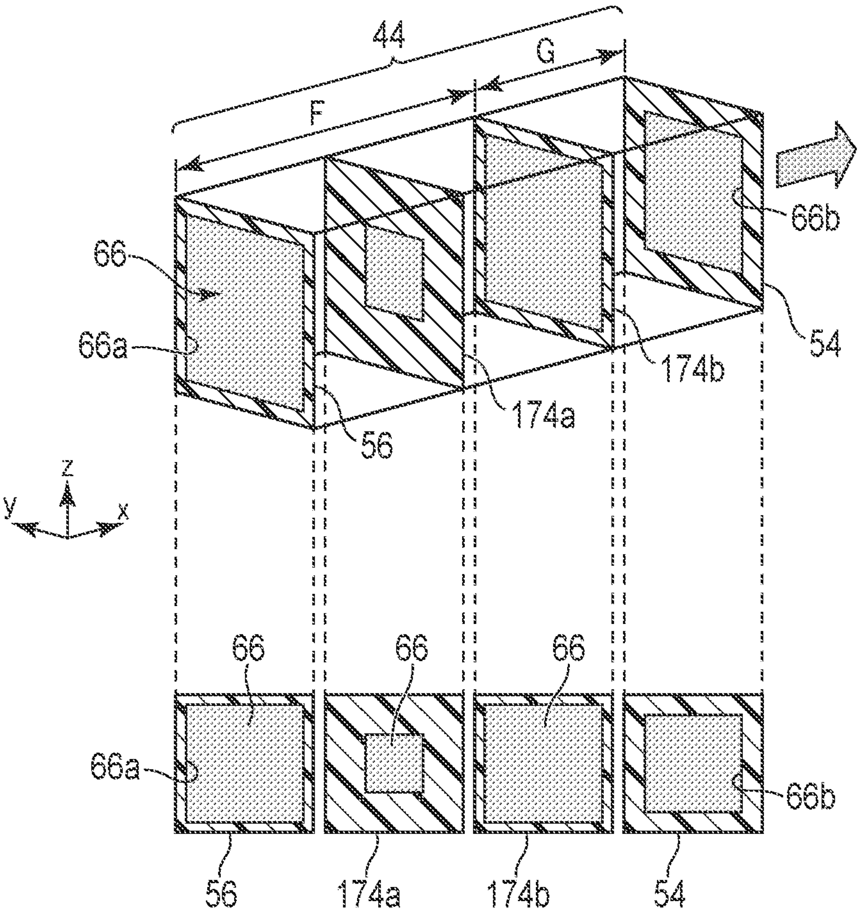
FIG. 12 is a modification to the mixing portion of the fluid controller in the fluid mixer.

As shown in FIG. 12, the mixing portion 44 has two virtual cross-sections 174*a* and 174*b* at a predetermined interval between the channel terminating portion 56 of the fluid channel deformation portion 42 of the fluid controller 16 and the downstream end portion 54 of the mixing portion 44. The cross-sections 174*a* and 174*b* are parallel to the portions (end faces) 56 and 54 and also parallel to the YZ plane.

The mixing portion 44 of the fluid controller 16 has two fluid channel sections F and G of different functions between the channel terminating portion 56 and the downstream end portion 54. One of the fluid channel sections, which is on the upstream side, is a mixing section F (from the channel terminating portion 56 to the cross-section 174*b*), and the other fluid channel section on the downstream side is a discharge section G (from the cross-section 174*b* to the downstream end portion 54).

The inside fluid channel area of the mixing channel 66 decreases gradually from the channel terminating portion 56 to the cross-section 174*a* in the mixing portion 44 and increases gradually from the cross-section 174*a* to the cross-section 174*b*. That is, the mixing channel 66 varies in its placement and shape from the channel terminating portion 56 to the cross-section 174*a* and from the cross-section 174*a* to the cross-section 174*b*. In the mixing channel 66 from the channel terminating portion 56 to the cross-section 174*a* in the mixing portion 44, a pressure loss increases due to a partial reduction in the fluid channel area, but the reduction in the inside fluid channel area of the mixing channel 66 improves the performance of mixture of a plurality of fluids. In addition, the mixing portion 44 gradually increases the fluid channel area of the mixing channel 66 from the cross-section 174*a* to the cross-section 174*b*. Therefore, the mixing portion 44 prevents the mixing channel 66 from increasing and decreasing in size suddenly and also prevents a pressure loss due to a separation vortex or the like from increasing.

Another modification to the mixing portion 44 of the fluid controller 16 of the fluid mixer 10 shown in FIG. 12 will be described with reference to FIG. 13.

Figure 13:
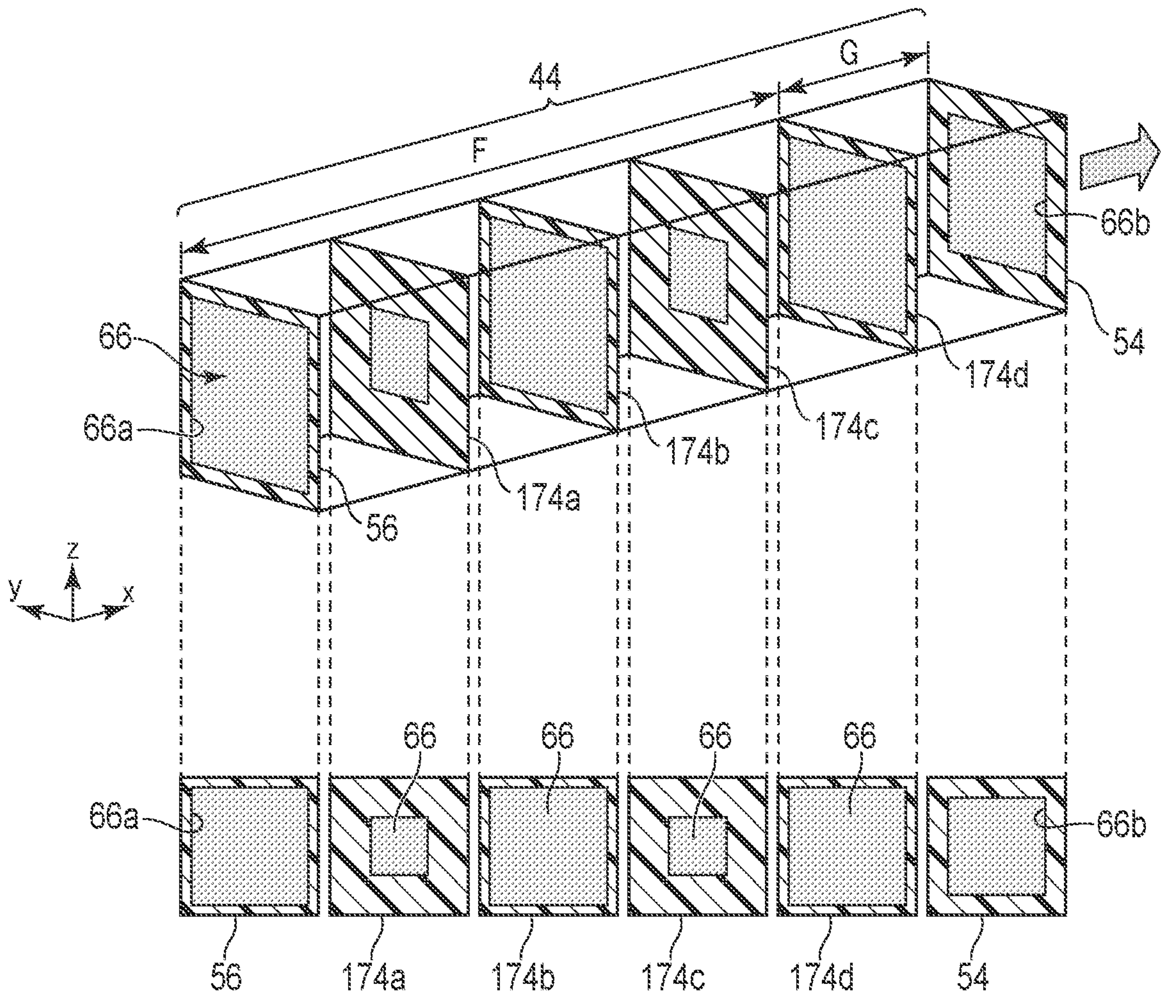
FIG. 13 is a modification to the mixing portion of the fluid controller in the fluid mixer.

As shown in FIG. 13, the mixing portion 44 has four virtual cross-sections 174*a*, 174*b*, 174*c* and 174*d* at predetermined intervals between the channel terminating portion 56 of the fluid channel deformation portion 42 of the fluid controller 16 and the downstream end portion 54 of the mixing portion 44. The cross-sections 174*a*, 174*b*, 174*c* and 174*d* are parallel to the portions (end faces) 56 and 54 and also parallel to the YZ plane.

The mixing portion 44 of the fluid controller 16 has two fluid channel sections F and G of different functions between the channel terminating portion 56 and the downstream end portion 54. One of the fluid channel sections, which is on the upstream side, is a mixing section F (from the channel terminating portion 56 to the cross-section 174*d*), and the other fluid channel section on the downstream side is a discharge section G (from the cross-section 174*d* to the downstream end portion 54).

The inside fluid channel area of the mixing channel 66 decreases gradually from the channel terminating portion 56 to the cross-section 174*a* in the mixing portion 44. It increases gradually from the cross-section 174*a* to the cross-section 174*b* in the mixing portion 44. It decreases gradually from the cross-section 174*b* to the cross-section 174*c* in the mixing portion 44. It increases gradually from the cross-section 174*c* to the cross-section 174*d* in the mixing portion 44.

In the mixing channel 66 from the channel terminating portion 56 to the cross-section 174*a* in the mixing portion 44 and the mixing channel 66 from the cross-section 174*b* to the cross-section 174*c*, a pressure loss increases due to a partial reduction in the fluid channel area, whereas the repetitive increase and decrease in the inside fluid channel area of the mixing channel 66 improves the performance of mixture of a plurality of fluids.

Still another modification to the mixing portion 44 of the fluid controller 16 of the fluid mixer 10 shown in FIGS. 12 and 13 will be described with reference to FIG. 14.

Figure 14:
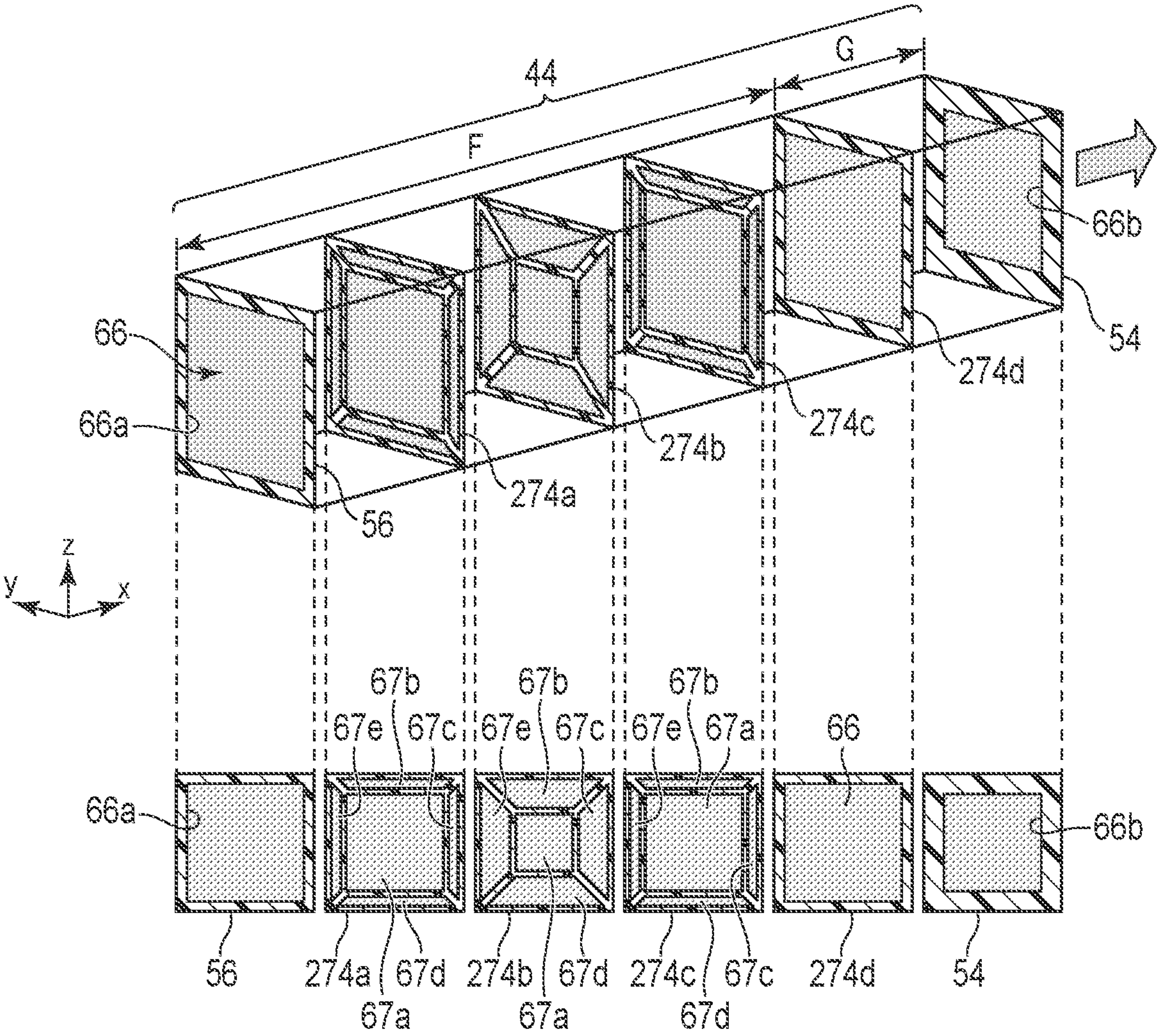
FIG. 14 is a modification to the mixing portion of the fluid controller in the fluid mixer.

As shown in FIG. 14, the mixing portion 44 has four virtual cross-sections 274*a*, 274*b*, 274*c* and 274*d* at predetermined intervals between the channel terminating portion 56 of the fluid channel deformation portion 42 of the fluid controller 16 and the downstream end portion 54 of the mixing portion 44. The cross-sections 274*a*, 274*b*, 274*c* and 274*d* are parallel to the portions (end faces) 56 and 54 and also parallel to the YZ plane.

The mixing portion 44 of the fluid controller 16 has two fluid channel sections F and G of different functions between the channel terminating portion 56 and the downstream end portion 54. One of the fluid channel sections, which is on the upstream side, is a mixing section F (from the channel terminating portion 56 to the cross-section 274*d*), and the other fluid channel section on the downstream side is a discharge section G (from the cross-section 274*d* to the downstream end portion 54).

In the cross-section 274*a*, the mixing portion 44 has a substantially rectangular fluid channel 67*a* in its center and four substantially trapezoidal fluid channels 67*b*, 67*c*, 67*d* and 67*e* surrounding the substantially rectangular fluid channel 67*a*. These five fluid channels 67*a*, 67*b*, 67*c*, 67*d* and 67*e* are branched between the channel terminating portion 56 and the cross-section 274*c*.

In the cross-section 274*b*, the substantially rectangular fluid channel 67*a* decreases in size and four substantially trapezoidal fluid channels 67*b*, 67*c*, 67*d* and 67*e* increase in size. In the cross-section 274*b*, the rectangular fluid channel 67*a* increases in size and the four substantially trapezoidal fluid channels 67*b*, 67*c*, 67*d* and 67*e* decrease in size. The fluid channel area of the mixing channel 66 of the mixing portion 44 is substantially constant from the channel terminating portion 56 to the cross-section 274*d*. The mixing portion 44 can thus prevent a pressure loss of fluids in the mixing channel 66 from increasing.

As in the examples shown in FIGS. 12 and 13, the fluid channels 67*a*, 67*b*, 67*c*, 67*d* and 67*e* gradually decrease and increase in size from the cross-section 274*a* to the cross-section 274*c*. Therefore, as in the examples shown in FIGS. 12 and 13, the performance of mixture of fluids can be improved between the cross-sections 274*a* and 274*c*.

From the cross-section 274*a* to the cross-section 274*c*, the fluid channels 67*a*, 67*b*, 67*c*, 67*d* and 67*e* gradually decrease and increase in size, but the mixing channel 66 is prevented from increasing and decreasing in size suddenly, and the total fluid channel area is substantially constant. Thus, a pressure loss due to a separation vortex or the like can be prevented from increasing in the fluid channels 67*a*, 67*b*, 67*c*, 67*d* and 67*e* between the cross-sections 274*a* and 274*c*.

Second Embodiment

Figure 15:
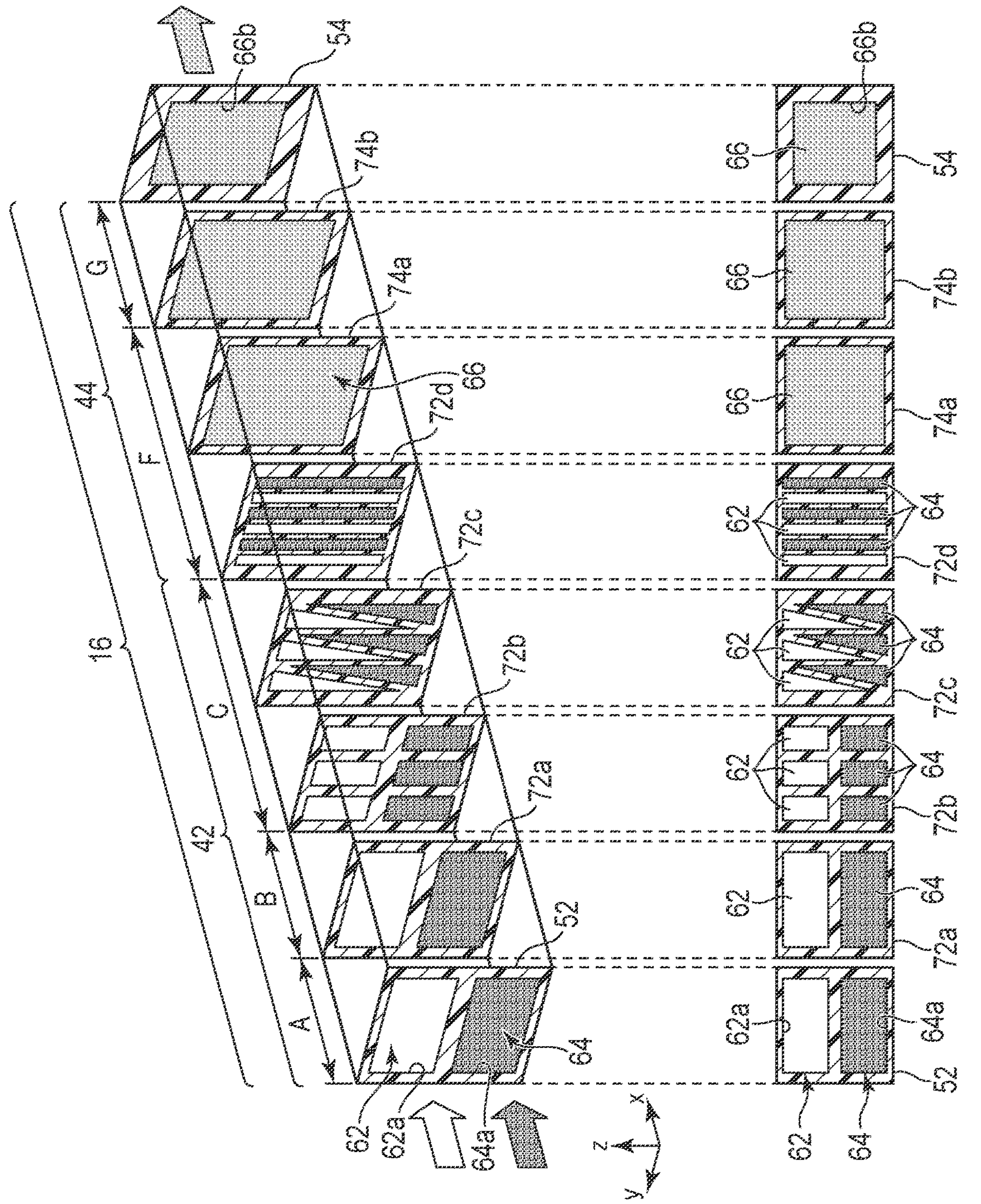
FIG. 15 is a schematic perspective view of a fluid controller of a second embodiment in the fluid mixer, schematically showing the shape of a fluid channel in an appropriate location in the fluid controller.

A fluid mixer 10 according to a second embodiment will be described with reference to FIG. 15. Note that the descriptions of the portions of the second embodiment which overlap with those of the first embodiment including the modifications will be omitted. FIG. 15 shows a fluid controller 16 of the fluid mixer 10. The upstream pipes 12 and 14 and the downstream pipe 18 (none of which is shown) have the same configurations as those described in the first embodiment.

The fluid channel deforming portion 42 of the fluid controller 16 of the second embodiment has an introduction section A, a branch section B and a cross-section deforming section C. In other words, the fluid channel deforming portion 42 of the second embodiment does not have any equivalents to the branch section D and shift section E of the fluid channel deforming portion 42 of the fluid controller 16 of the first embodiment shown in FIG. 2.

According to the second embodiment, since neither the branch section D nor the shift section E is provided, the first and second fluids are not adjacent to each other in multiple directions, but the length of the fluid channel deforming portion 42 along the X-axis direction can be shortened. Thus, the fluid channel deforming portion 42 of the fluid controller 16 of the second embodiment can prevent an increase in the pressure loss of fluids flowing through the fluid channel deforming portion 42, and the total length of the fluid controller 16 along the X-axis direction can be made shorter than that of the fluid controller 16 according to the first embodiment.

Therefore, the second embodiment can provide a fluid controller 16 with high mixing efficiency and a fluid mixer 10 including the fluid controller 16.

Third Embodiment

Figure 16:
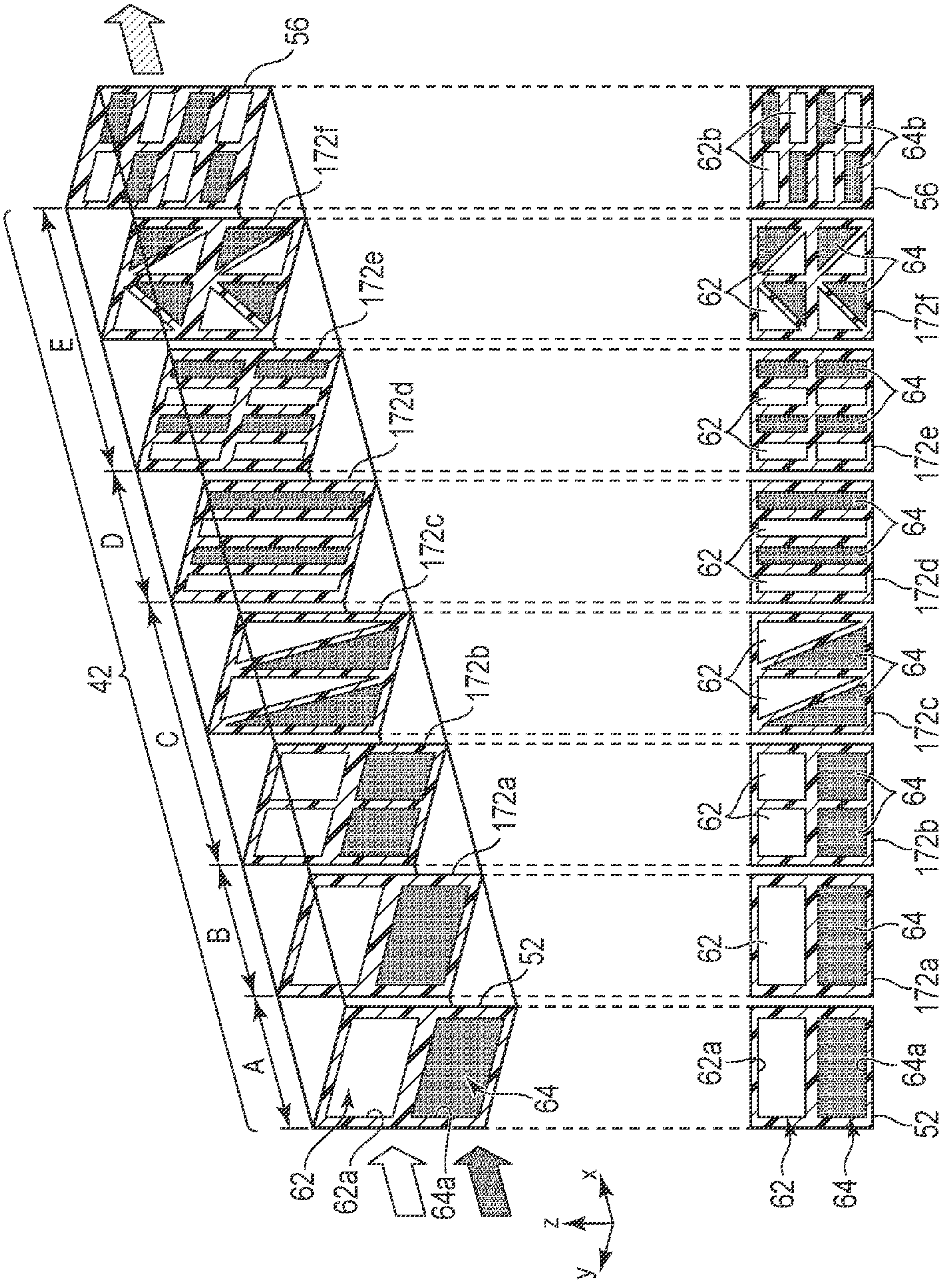
FIG. 16 is a schematic perspective view of a fluid channel deforming portion of a fluid controller of a third embodiment in the fluid mixer, showing the shape of a fluid channel in an appropriate location in the fluid channel deforming portion.

A fluid mixer 10 according to a third embodiment will be described with reference to FIG. 16. Note that the descriptions of the portions of the third embodiment which overlap with those of the first embodiment including the modifications and the second embodiment will be omitted. FIG. 16 shows a fluid channel deforming portion 42 and does not show the mixing portion 44. The mixing portion 44, upstream pipes 12 and 14 and downstream pipe 18 (none of which is shown) have the same configurations as those described in the first and second embodiments. The mixing portion 44 is formed integrally with the fluid channel deforming portion 42 or configured detachably therefrom.

The fluid channel deforming portion 42 of the fluid controller 16 of the third embodiment has an introduction section A, a branch section (first branch section) B, a cross-section deforming section (first cross-section deforming section) C, a branch section (second branch section) D and a cross-section deforming section (second cross-section deforming section) E. In other words, the fluid channel deforming portion 42 the third embodiment has the cross-section deforming section E in place of the shift section E of the fluid channel deforming portion 42 of the fluid controller 16 of the first embodiment shown in FIG. 2.

The fluid channel deforming portion 42 has an upstream end portion 52, six cross-sections 172*a*, 172*b*, 172*c*, 172*d*, 172*e* and 172*f* and a channel terminating portion 56. In the third embodiment, the fluid channel deforming portion 42 has six virtual cross-sections 172*a*, 172*b*, 172*c*, 172*d*, 172*e* and 172*f* at predetermined intervals between the portions (end faces) 52 and 56 of the fluid channel deforming portion 42 of the fluid controller 16. The cross-sections 172*a*, 172*b*, 172*c*, 172*d*, 172*e* and 172*f* are parallel to the portions (end faces) 52 and 56 and also parallel to the YZ plane.

The cross-section 172*a* has the same shape as that of the cross-section 72*a* described in the first embodiment. The cross-section 172*b* corresponds to the cross-section 72*b* described in the first embodiment. The number of branches of the first and second channels 62 and 64 of the cross-section 172*b* is smaller than the number of branches of the cross first and second channels 62 and 64 of the cross-section 72*b* described in the first embodiment. The cross-section 172*c* corresponds to the cross-section 72*c* described in the first embodiment. The number of branches of the first and second channels 62 and 64 of the cross-section 172*c* is smaller than the number of branches of the first and second channels 62 and 64 of the cross-section 72*c* described in the first embodiment. The cross-section 172*d* corresponds to the cross-section 72*d* described in the first embodiment. The number of branches of the first and second channels 62 and 64 of the cross-section 172*d* is smaller than the number of branches of the first and second channels 62 and 64 of the cross-section 72*d* described in the first embodiment. The cross-section 172*e* shows the first and second channels 62 and 64 into which the first and second channels 62 and 64 of the cross-section 172*d* are branched.

In the cross-section deforming section E defined from the cross-section 172*e* to the channel terminating portion 56, the first and second channels 62 and 64 are changed in shape from rectangles to triangles between the cross-section 172*e* and the cross-section 172*f*. The first and second channels 62 and 64 are changed in shape from triangles to quadrangles between the cross-section 172*f* and the channel terminating portion 56.

According to the third embodiment, in the channel terminating portion 56, the first most downstream openings 62*b* of the first channel 62 and the second most downstream openings 64*b* of the second channel 64 are arranged alternately in the Z-axis direction and arranged adjacently in the Y-axis direction.

According to the third embodiment, since the cross-section deforming section E shown in FIG. 16 is used in place of the shift section E shown in FIG. 2 of the first embodiment, the first and second channels 62 and 64 are arranged alternately in the Z-axis direction in the vicinity of both ends of the channel terminating portion 56 in the Y-axis direction. That is, in the third embodiment, three flow paths of the first channel 62 are not arranged in the Z-axis direction via base materials in the vicinity of one of the ends in the Y-axis direction or three flow paths of the second channel 64 are not arranged in the Z-axis direction via base materials in the vicinity of the other end. Thus, the fluid channel deforming portion 42 can be so configured that the first and second fluids flow adjacent to each other in multiple directions to reduce unevenness of distribution of the first and second fluids to be mixed from the channel terminating portion 56 to the mixing portion 44. The fluid controller 16 of the third embodiment can thus improve the performance of mixture of the first and second fluids.

Therefore, the third embodiment can provide a fluid controller 16 with high mixing efficiency and a fluid mixer 10.

(First Modification)

A first modification to the channel terminating portion 56 of the fluid channel deforming portion 42 of the fluid controller 16 according to the third embodiment will be described with reference to FIG. 17.

In the first modification, the channel terminating portion 56 includes eight flow paths of the first channel 62 and eight flow paths of the second channel 64.

In the foregoing third embodiment, the sizes of all the first and second channels 62 and 64 are the same in the channel terminating portion 56 of the fluid controller 16 shown in FIG. 16. That is, the size of each of the first channel 62 is constant, as is the size of each of the second channel 64.

Figure 17:
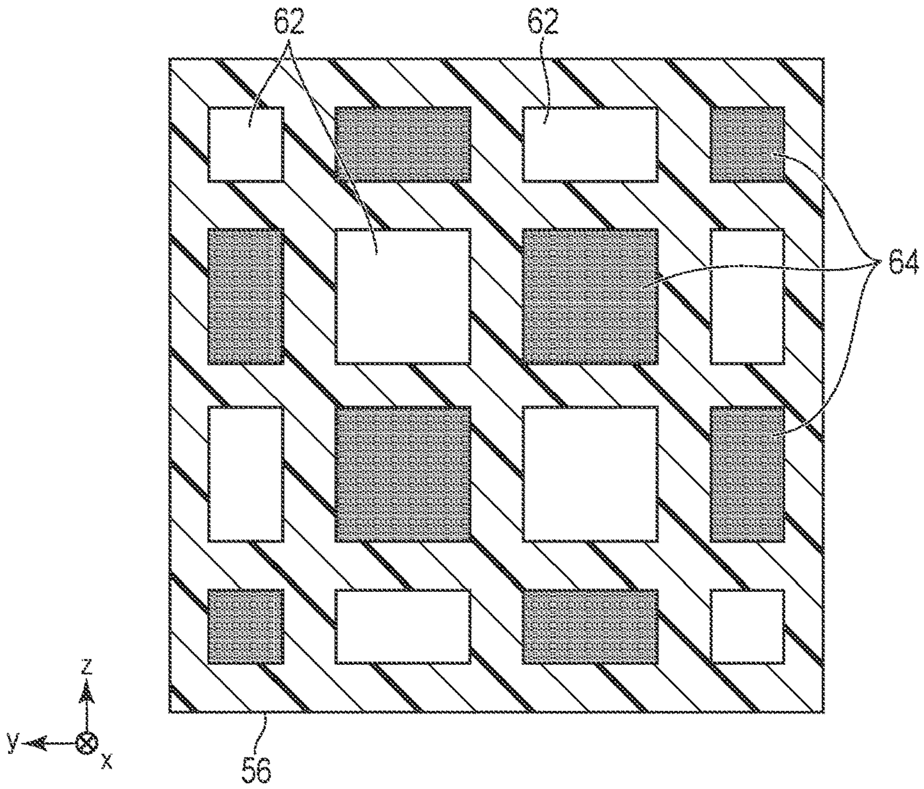
FIG. 17 is a first modification to a channel terminating portion of the fluid controller of the third embodiment.

In the case of the channel terminating portion 56 shown in FIG. 17, like the channel terminating portion 56 of the fluid controller 16 shown in FIG. 16, the first and second channels 62 and 64 are formed alternately in the Y-axis direction. The first and second channels 62 and 64 are formed alternately in the Z-axis direction. The size of each of the first channel 62 varies from position to position, as does the size of each of the second channel 64. In the channel terminating portion 56, outside of a first channel 62 close to the center, a second channel 64 the area of which is smaller than that of the first channel 62 is formed. Outside a second channel 64 close to the center, a first channel 62 the area of which is smaller than that of the second channel 64 is formed.

In the channel terminating portion 56 shown in FIG. 17, the width of each of the flow paths of the first and second channels 62 and 64 on the right and left sides in the Y-axis direction is smaller than that of each of the flow paths of the first and second channels 62 and 64 in the central part. In the channel terminating portion 56 shown in FIG. 17, the width of each of the flow paths of the first and second channels 62 and 64 on the upper and lower sides in the Z-axis direction is smaller than that of each of the flow paths of the first and second channels 62 and 64 in the central part. In the channel terminating portion 56 shown in FIG. 17, the width of each of the flow paths of the first channel 62 on the upper left and lower right sides and each of the flow paths of the second channel 64 on the upper right and lower left sides in the Y-axis direction is smaller than that of each of the flow paths of the first and second channels 62 and 64 in the central part, as is the width thereof in the Z-axis direction. In the modification shown in FIG. 17, therefore, among the first and second channels 62 and 64 of the channel terminating portion 56, the flow paths of the channels 62 and 64 having few adjacent regions are decreased in size.

For the reason described above, when the fluids are mixed in the mixing portion 44, unevenness of distribution of the fluids can be reduced more than the case where the first and second channels 62 and 64 are all the same. The performance of mixture of fluids in the mixing portion 44 can thus be improved by setting the size of each of the first and second channels 62 and 64 as shown in FIG. 17 in the channel terminating portion 56.

In addition, the width of each of the flow paths of the first and second channels 62 and 64 close to the outer edge of the channel terminating portion 56 is smaller than that of each of the flow paths of the first and second channels 62 and 64 in the central part thereof. Thus, the distance required for the mixture of the fluids, namely, the length of the mixing portion 44 along the X-axis direction can be shortened.

Note that the shapes of the first and second channels 62 and 64 of the channel terminating portion 56 shown in FIG. 17 described above are preferably applied to the range from the cross-section 72*e* to the channel terminating portion 56 of the fluid channel deforming portion 42 of the fluid controller 16 described in the first embodiment.

(Second Modification)

Figure 18:
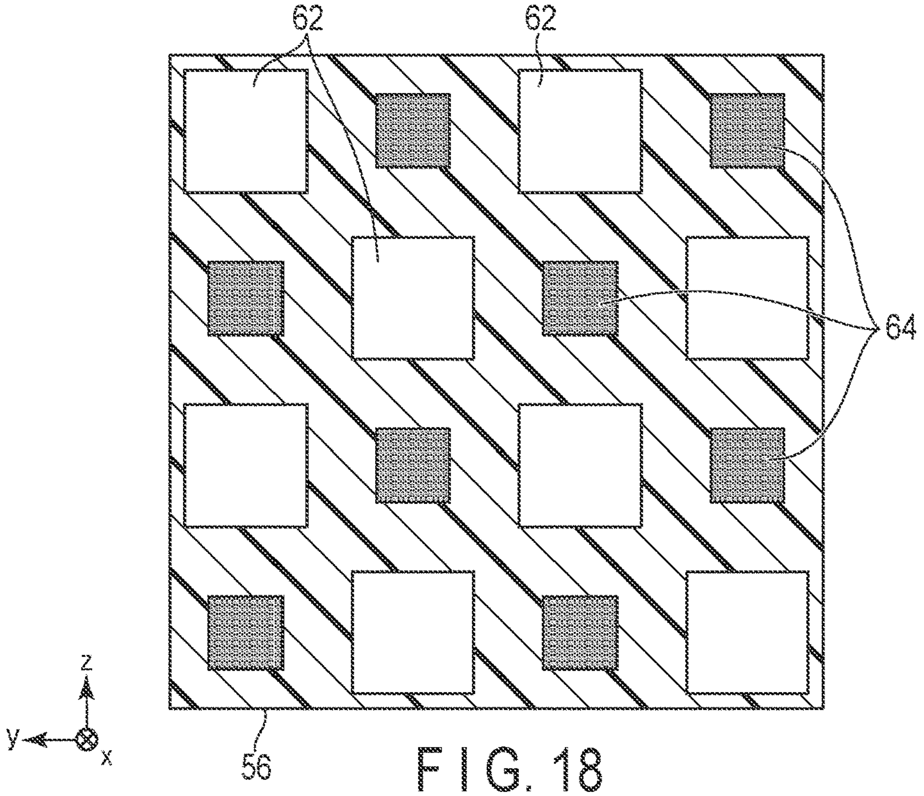
FIG. 18 is a second modification to the channel terminating portion of the fluid controller of the third embodiment.

A second modification to the channel terminating portion 56 of the fluid controller 16 will be described with reference to FIG. 18. Here is a description of the shapes of first and second channels 62 and 64 in the channel terminating portion 56.

In the second modification, all the first channel 62 have the same shape and the same size, as do all the second channel 64. A region for the first channel 62 is larger than that for the second channel 64.

Assuming that the same number of fluids flow per unit area, the flow rate of fluids flowing through the first channel 62 and that of fluids flowing through the second channel 64 are different from each other. In the second modification, the flow rate of fluids flowing through the second channel 64 is higher than that of fluids flowing through the first channel 62.

Since the flow rates of a plurality of fluids are different, a vortex is easily generated when the fluids are mixed in the mixing portion 44. In the region from the channel terminating portion 56 of the fluid channel deforming portion 42 to the cross-section 74*a* of the mixing portion 44, a distance between the first most downstream opening 62*b* of each of the first channel 62 and the second most downstream opening 64*b* of each of the second channel 64 easily becomes larger than that in the first modification. Thus, the second channel 64 vary more greatly and a vortex is generated in the second fluid more easily than in the first modification. The fluid controller 16 can thus improve the performance of mixture of the first and second fluids.

(Third Modification)

A third modification to the channel terminating portion 56 of the fluid controller 16 will be described with reference to FIG. 19. Here is a description of the shapes of first and second channel 62 and 64 in the channel terminating portion 56.

Figure 19:
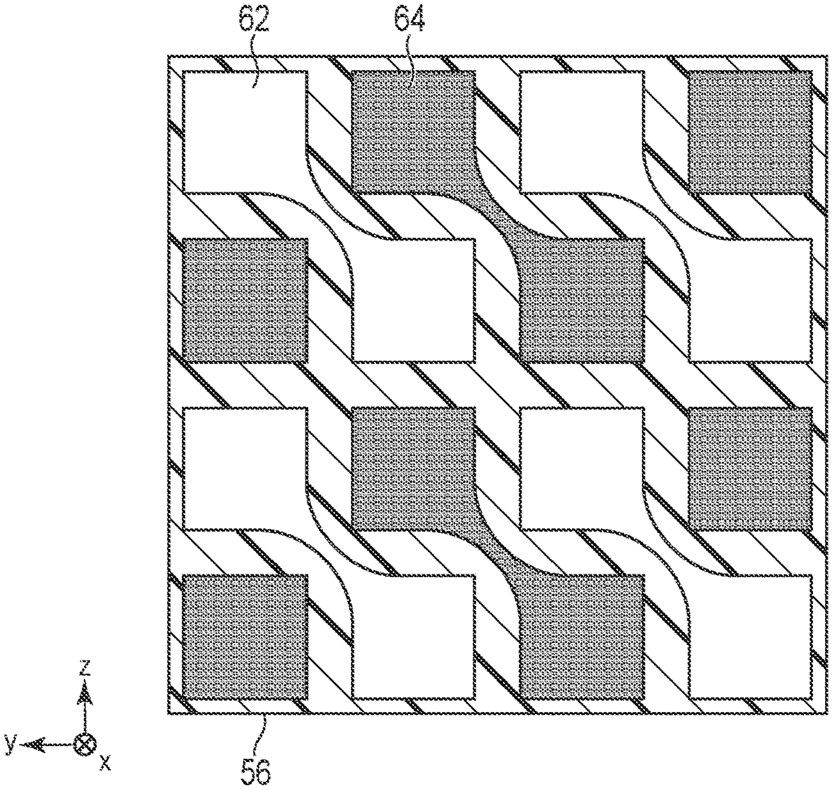
FIG. 19 is a third modification to the channel terminating portion of the fluid controller of the third embodiment.

In the channel terminating portion 56 shown in FIG. 19, two flow paths of the first channel 62 are adjacent in a direction inclined to the Y axis and the Z axis and are continuous with each other. Similarly, two flow paths of the second channel 64 are adjacent in a direction inclined to the Y axis and the Z axis and are continuous with each other.

In the example of FIG. 19, the two flow paths of the first channel 62 are adjacent in the inclined direction and are continuous with each other, but three or more flow paths of the first channel 62 may be continuous. Similarly, three or more flow paths of the second channel 64 may be continuous.

In the above case, it is possible to reduce the required number of resin materials serving as a base material for forming the fluid controller 16. Since, furthermore, the first and second channels 62 and 64 can be increased in size, a pressure loss to the first and second fluids can be reduced.

(Fourth Modification)

Figure 20:
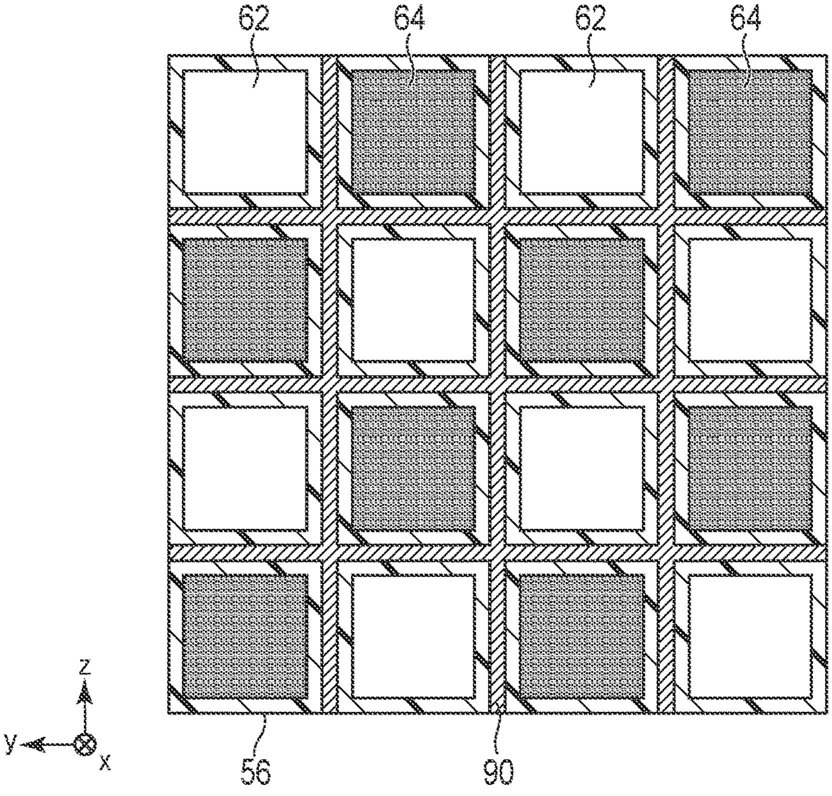
FIG. 20 is a fourth modification to the channel terminating portion of the fluid controller of the third embodiment.

A fourth modification to the fluid controller 16 will be described with reference to FIG. 20. FIG. 20 shows a channel terminating portion 56.

As shown in FIG. 20, the fluid controller 16 is formed of a resin material. The base material to form the fluid channel walls of flow paths of the first and second channels 62 and 64 is a resin material. A thin metal film 90 is embedded in the resin material. The thin metal film 90 is preferably embedded between the upstream end portion 52 and channel end portion 56 of the fluid channel deforming portion 42. The thin metal film 90 is preferably a material having high thermal conductivity. More specifically, the thin metal film 90 is formed, as a material whose thermal conductivity is higher than that of a resin material serving as a base material, on the inner surfaces of the fluid channel walls of the flow paths of the first and second channels 62 and 64. As the thin metal film 90, for example, one or two or more metals or alloys selected from copper, aluminum, iron, stainless steel, titanium and titanium alloy can be used. Note that the thin metal film 90 is not exposed to the surfaces of the flow paths of the first channel 62 which are in contact with the first fluid or the surfaces of the flow paths of the second channel 64 which are in contact with the second fluid. Thus, the thin metal film 90 functions as a thermally conductive layer and serves as a partition wall between the flow paths of the first and second channels 62 and 64.

When the first and second fluids differ in temperature in the upstream end portion 52 of the fluid channel deforming portion 42, when the first and second fluids are caused to flow through the fluid channel deforming portion 42, heat is conducted to the thin metal film 90 through the resin material by which the fluid controller 16 is configured. Therefore, when the first and second fluids flow through the fluid channel deforming portion 42 of the fluid controller 16, a temperature difference between the first and second fluids decreases toward downstream.

Therefore, the use of the fluid controller 16 of the fourth modification can decrease a temperature difference between the first and second fluids to be mixed in the mixing portion 44.

Note that when the wall of the mixing channel 66 is formed of a resin material, a material whose thermal conductivity is higher than that of the resin material is preferably disposed on the inner surface of the wall. As materials having high thermal conductivity, for example, copper, aluminum, iron, stainless steel, titanium, and titanium alloy are selected.

Fourth Embodiment

Figure 21:
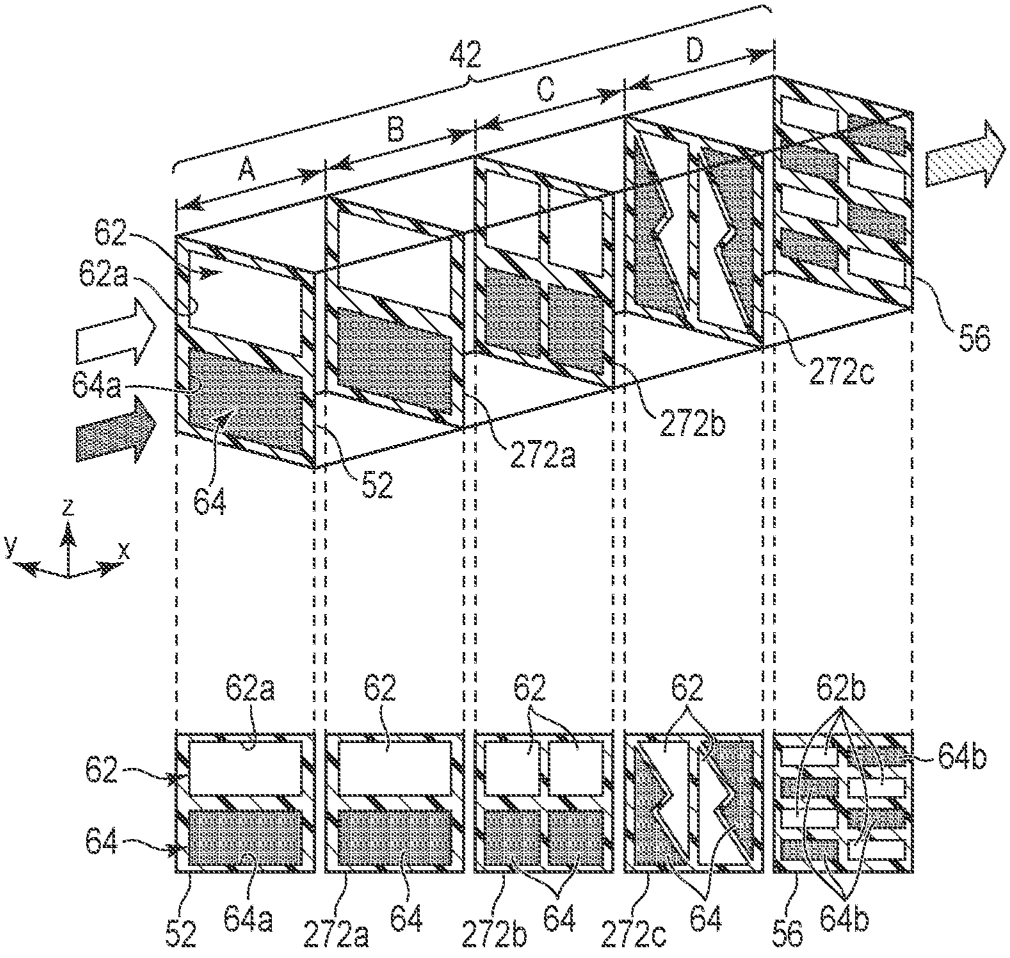
FIG. 21 is a schematic perspective view of a fluid channel deforming portion of a fluid controller of a fourth embodiment in the fluid mixer, showing the shape of a fluid channel in an appropriate location in the fluid channel deforming portion.

The fluid channel deforming portion 42 of a fluid controller 16 according to a fourth embodiment will be described with reference to FIG. 21. Note that the descriptions of the portions of the fourth embodiment which overlap with those of the first to third embodiments including the modifications will be omitted. FIG. 21 shows the fluid channel deforming portion 42, not the mixing portion 44. The mixing portion 44, upstream pipes 12 and 14 and downstream pipe 18 (none of which is shown) have the same configurations as those described in the first to third embodiments.

The fluid channel deforming portion 42 of the fluid controller 16 of the fourth embodiment has an introduction section A, a branch section (first branch section) B, a cross-section deforming section (first cross-section deforming section) C and a branch section (second branch section) D. The fluid channel deforming portion 42 of the fourth embodiment does not have any equivalent to the shift section E of the fluid channel deforming portion 42 of the fluid controller shown in FIG. 2.

The fluid channel deforming portion 42 has an upstream end portion 52, three cross-sections 272*a*, 272*b* and 272*c* and a channel terminating portion 56. In the fourth embodiment, the fluid channel deforming portion 42 has three virtual cross-sections 272*a*, 272*b* and 272*c* at predetermined intervals between the portions (end faces) 52 and 56 of the fluid channel deforming portion 42 of the fluid controller 16. The cross-sections 272*a*, 272*b* and 272*c* are parallel to the portions (end faces) 52 and 56 and also parallel to the YZ plane.

The cross-section 272*a* has the same shape as that of the cross-section 72*a* described in the first embodiment. The cross-section 272*b* has the same shape as that of the cross-section 172*b* shown in FIG. 16 described in the third embodiment. In the cross-section deforming section C defined from the cross-section 272*b* to the cross-section 272*c*, the first and second channels 62 and 64 are each changed from a rectangle to a shape like two triangles connected in the Z-axis direction. The two triangles have one common side. This shape is like the national flag of Nepal, for example. In the branch section D defined from the cross-section 272*c* to the channel terminating portion 56, the first and second channels 62 and 64 are each changed from the shape like two connected triangles to a rectangle, and branched.

Like in the channel terminating portion 56 shown in FIG. 16 of the third embodiment, in the channel terminating portion 56 of the fourth embodiment, the first most downstream openings 62*b* of the first channel 62 and the second most downstream openings 64*b* of the second channel 64 are arranged alternately in the Z-axis direction and adjacently in the Y-axis direction.

According to the fourth embodiment, in the cross-section deforming section C between the adjacent cross-sections 272*b* and 272*c*, flow paths of the first and second channels 62 and 64 are deformed once into contact with each other in two directions along the Z-axis direction. In other words, the flow paths of the first and second channels 62 and 64 are adjacent to each other in two directions along the Z-axis direction. The fluid channels of the fluid controller 16 along the X-axis direction can thus be shortened. It is thus possible to decrease a forming area of the fluid channel deforming portion 42 of the fluid controller 16. Since the first and second channels 62 and 64 can be shortened in the X-axis direction, a pressure loss generated in the first and second fluids can be reduced.

Therefore, the fourth embodiment can provide a fluid controller 16 with high mixing efficiency and a fluid mixer 10.

Fifth Embodiment

Figure 22:
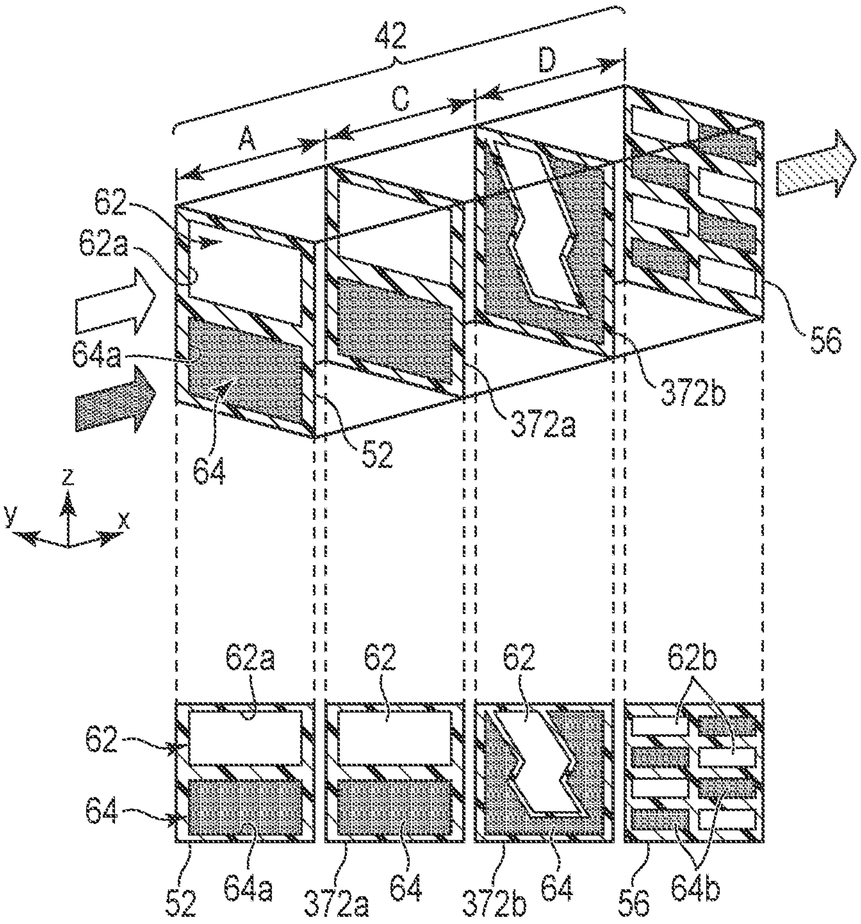
FIG. 22 is a schematic perspective view of a fluid channel deforming portion of a fluid controller of a fifth embodiment in the fluid mixer, showing the shape of a fluid channel in an appropriate location in the fluid channel deforming portion.

The fluid channel deforming portion 42 of a fluid controller 16 according to a fifth embodiment will be described with reference to FIG. 22. Note that the descriptions of the portions of the fifth embodiment which overlap with those of the first to fourth embodiments including the modifications will be omitted. FIG. 22 shows the fluid channel deforming portion 42, not the mixing portion 44. The mixing portion 44, upstream pipes 12 and 14 and downstream pipe 18 (none of which is shown) have the same configurations as those described in the first to fourth embodiments.

The fluid channel deforming portion 42 of the fluid controller 16 of the fifth embodiment has an introduction section A, a cross-section deforming section C and a branch section (second branch section) D. The fluid channel deforming portion 42 of the fifth embodiment does not have any equivalents to the branch section B and shift section E of the fluid channel deforming portion 42 of the fluid controller shown in FIG. 2.

The fluid channel deforming portion 42 has an upstream end portion 52, two cross-sections 372*a* and 372*b*, and a channel terminating portion 56. In the fifth embodiment, the fluid channel deforming portion 42 has two virtual cross-sections 372*a* and 372*b* at predetermined intervals between the portions (end faces) 52 and 56 of the fluid channel deforming portion 42 of the fluid controller 16. The cross-sections 372*a* and 372*b* are parallel to the portions (end faces) 52 and 56 and also parallel to the YZ plane.

The cross-section 372*a* has the same shape as that of the cross-section 72*a* described in the first embodiment. In the cross-section deforming section C defined from the cross-section 372*a* to the cross-section 372*b*, the second channel 62 as a whole is deformed into a substantially U-shaped channel. The first channel 62 is formed inside the second channel 64. More specifically, the second channel 64 is changed to a shape like two triangles connected in the Z-axis direction as described in the fourth embodiment with reference to FIG. 21. The first channel is changed to a shape like two first channel connected as described in the fourth embodiment with reference to FIG. 21. In the branch section D defined from the cross-section 372*b* to the channel terminating portion 56, the first and second channels 62 and 64 are each changed from the shape like two connected triangles to a rectangle, and branched.

Like in the channel terminating portion 56 shown in FIG. 16 of the third embodiment and FIG. 21 of the fourth embodiment, in the channel terminating portion 56 of the fifth embodiment, the first most downstream openings 62*b* of the first channel 62 and the second most downstream openings 64*b* of the second channel 64 are arranged alternately in the Z-axis direction and adjacently in the Y-axis direction.

According to the fifth embodiment, in the cross-section deforming section C between the adjacent cross-sections 372*a* and 372*b*, flow paths of the first and second channels 62 and 64 are deformed once into contact with each other in two directions along the Z-axis direction. In other words, the flow paths of the first and second channels 62 and 64 are adjacent to each other in two directions along the Z-axis direction. The fluid channels of the fluid controller 16 along the X-axis direction can thus be made shorter than in the case described in the fourth embodiment. It is thus possible to decrease a forming area of the fluid channel deforming portion 42 of the fluid controller 16. Since the first and second channels 62 and 64 can be shortened in the X-axis direction, a pressure loss generated in the first and second fluids can be reduced.

Therefore, the fifth embodiment can provide a fluid controller 16 with high mixing efficiency and a fluid mixer 10.

Sixth Embodiment

Figure 23:
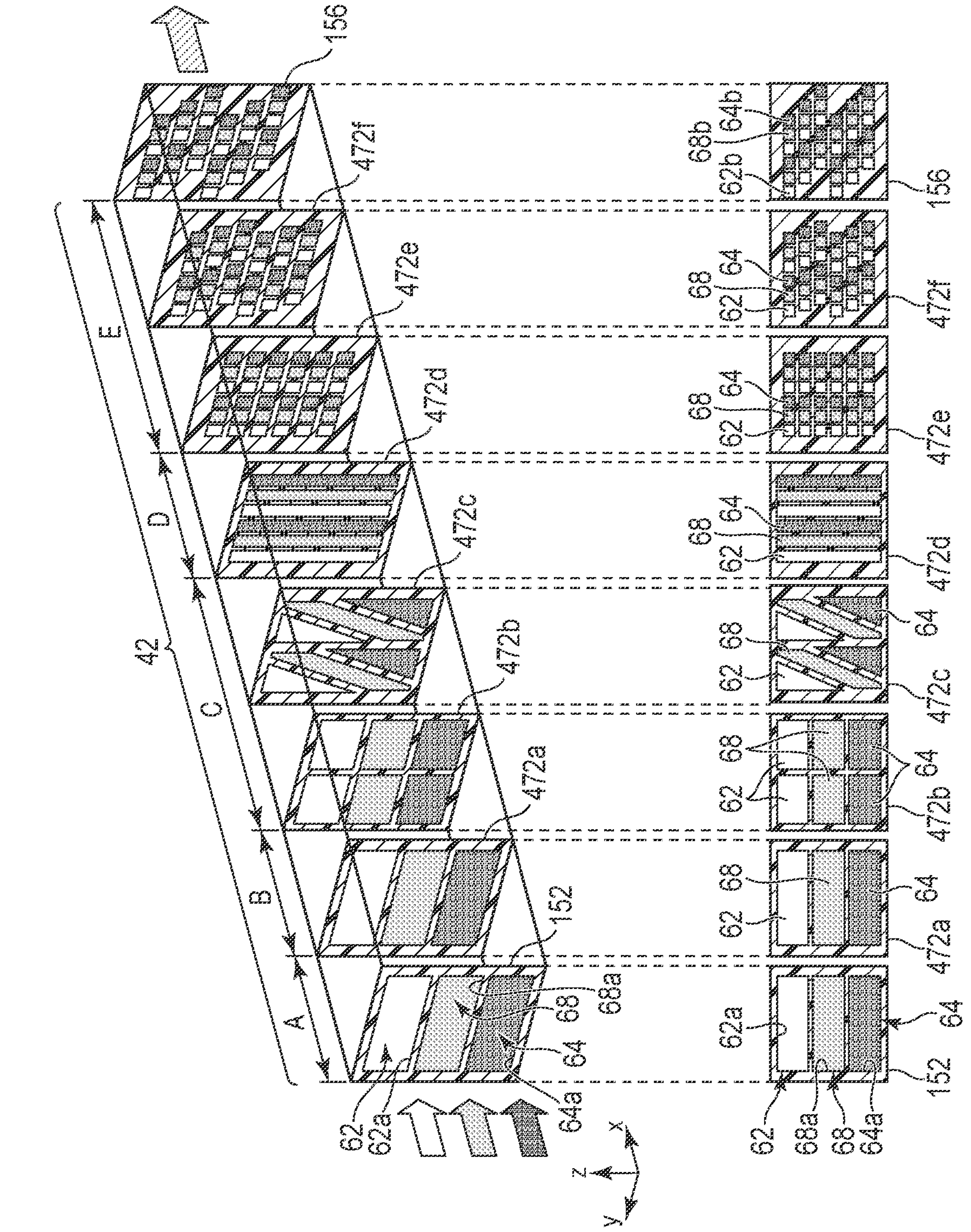
FIG. 23 is a schematic perspective view of a fluid channel deforming portion of a fluid controller of a sixth embodiment in the fluid mixer, showing the shape of a fluid channel in an appropriate location in the fluid channel deforming portion.

The fluid controller 16 according to a sixth embodiment will be described with reference to FIG. 23. In the sixth embodiment, the fluid channel deforming portion 42 includes first channel 62, second channel 64 and a third channel 68.

Note that the descriptions of the portions of the sixth embodiment which overlap with those of the first to fifth embodiments will be omitted. FIG. 23 shows the fluid channel deforming portion 42, not the mixing portion 44. The mixing portion 44 and downstream pipe 18 (neither of which is shown) have the same configurations as those described in the first to fifth embodiments. The fluid mixer 10 includes an upstream pipe 12 corresponding to the first channel 62 and an upstream pipe 14 corresponding to the second channel 64. The fluid mixer 10 also includes an upstream pipe (not shown) having the same configuration as that of each of the upstream pipes 12 and 14 and corresponding to the third channels 68.

The fluid channel deforming portion 42 of the fluid controller 16 of the sixth embodiment has an introduction section A, a branch section (first branch section) B, a cross-section deforming section C, a branch section (second branch section) D and a shift section E.

The fluid channel deforming portion 42 has an upstream end portion 152, six cross-sections 472*a*, 472*b*, 472*c*, 472*d*, 472*e* and 472*f*, and a channel terminating portion 156. The cross-sections 472*a*, 472*b*, 472*c*, 472*d*, 472*e* and 472*f* are parallel to the portions (end faces) 152 and 156 and also parallel to the YZ plane.

The upstream end portion 152 corresponds to the upstream end portion 52 described in the first embodiment. The upstream end portion 152 has a first most upstream opening 62*a*, a second most upstream opening 64*a* and a third most upstream opening 68*a*. A fluid is caused to flow into the third most upstream opening 68*a* through an upstream pipe (not shown). In the sixth embodiment, the first most upstream opening 62*a* is formed on the upper side of the sheet of FIG. 23, the second most upstream opening 64*a* is formed on the lower side thereof, and the third most upstream opening 68*a* is formed between the first and second most upstream openings 62*a* and 64*a*.

The third channel 68 communicates with the third most upstream opening 68*a* on the downstream side of the upstream end portion 152, and is provided adjacent to the first and second channels 62 and 64.

The channel terminating portion 156 corresponds to the channel terminating portion 56 described in the first embodiment. The channel termination portion 156 has a first most downstream opening 62*b*, a second most downstream opening 64*b* and a third most downstream opening 68*b*. The first most downstream opening 62*b* includes a plurality of openings as an opening group. The second most downstream opening 64*b* includes a plurality of openings as an opening group. The third most downstream opening 68*b* includes a plurality of openings as an opening group. In the sixth embodiment, the first, second and third most downstream openings 62*b*, 64*b* and 68*b* are arranged in order in the Y-axis direction and in the Z-axis direction.

The cross-section 472*a* corresponds to the cross-section 72*a* described in the first embodiment. The first, second and third channels 62, 64 and 68 are arranged like the first, second and third channels 62, 64 and 68 in the upstream end portion 152. The cross-section 472*b* corresponds to the cross-section 72*b* described in the first embodiment. The first, second and third channels 62, 64 and 68 are branched in the Y-axis direction. The cross-section 472*c* corresponds to the cross-section 72*c* described in the first embodiment. Flow paths of the first and second channels 62 and 64 are deformed into a substantially triangular shape. Flow paths of the third channel 68 are each deformed into a substantially parallelogram shape interposed between the first and second channel 62 and 64 along the Z-axis direction. The cross-section 472*d* corresponds to the cross-section 72*d* described in the first embodiment. In the cross-sections 472*a* and 472*b*, the fluid channels of the first, third and second channels 62, 68 and 64 arranged in this order from the upper side to the lower side along the Z-axis direction are changed to those of the first, third and second channels 62, 68 and 64 arranged in the order from the left side to the right side along the Y-axis direction. The cross-section 472*e* corresponds to the cross-section 72*e* described in the first embodiment. In the cross-section 472*e*, the first, third and second channels 62, 68 and 64 are each branched in the Z-axis direction. The cross-section 472*f* corresponds to the cross-section 72*f* described in the first embodiment. Flow paths of the first, third and second channels 62, 68 and 64 branched by the cross-section 472*e* are shifted in the Y-axis direction.

In the fluid channel deforming portion 42, between the upstream end portion 152 and the channel terminating portion 156, the region of the flow paths of the third channel 68 adjacent to the first channel 62 in a cross-section (first cross-section) such as the channel terminating portion 156 is increased more than that of the third channel 68 adjacent to the first channel 62 in a cross-section (second cross-section) such as the cross-section 472*a* which is located upstream from the channel terminating portion 156.

To mix three fluids together, the fluid controller 16 can be used when the channels 62, 64 and 68 are formed appropriately. That is, the sixth embodiment can provide a fluid mixer 10 capable of mixing three fluids together.

The sixth embodiment is directed to an example in which the fluid controller 16 includes the first, second and third channels 62, 64 and 68. To mix four or more fluids together, the channels have only to be arranged appropriately as described above.

The sixth embodiment can thus provide a fluid controller 16 with high mixing efficiency and a fluid mixer 10.

(Modification)

Figure 24:
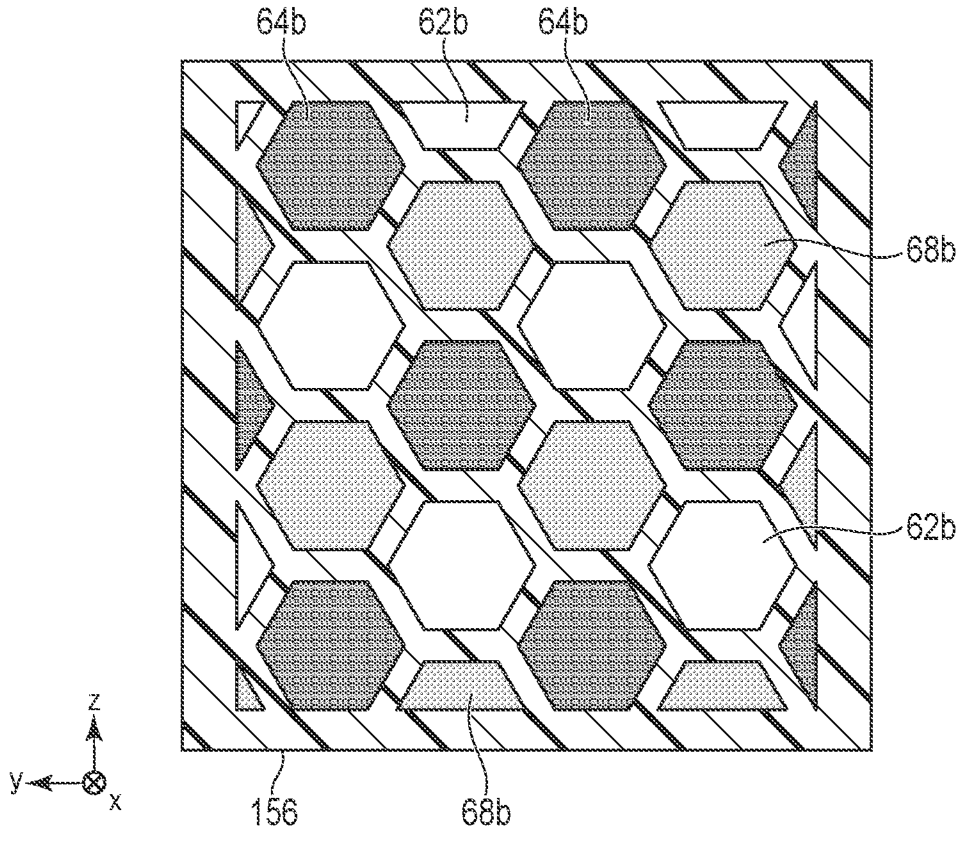
FIG. 24 is a modification to a channel terminating portion of the fluid controller of the sixth embodiment.

A modification to the channel terminating portion 56 of the fluid controller 16 according to the sixth embodiment will be described with reference to FIG. 24.

In this modification, flow paths of the first, second and third channels 62, 64 and 68 are arranged to have a honeycomb structure. In the example shown in FIG. 24, the first channel 62, third channel 68 and second channel 64 are arranged in this order along the Z-axis direction. The first channel 62, third channel 68 and second channel 64 are arranged in the same order in a direction inclined to the Z-axis and Y-axis directions. In this case, the second and third channels 64 and 69 are adjacent to first channel 62. The first and third channels 62 and 68 are adjacent to the second channel 64. The first and second channels 62 and 64 are adjacent to the third channel 68.

In a certain cross-section (second cross-section) such as the channel terminating portion 156 of the fluid channel deforming portion 42, the first, second and third channels 62, 64 and 68 each have a hexagonal honeycomb shape.

Therefore, the first, second and third fluids can be mixed together in the mixing portion 44 on the downstream side of the channel terminating portion 156.

In a cross-section (second cross-section) such as the cross-section 472*f* of the fluid channel deforming portion 42, at least one of the flow paths of the first, second and third channels 62, 64 and 68 may have a hexagonal shape.

At least one of the embodiments described above can provide a fluid controller 16 with high mixing efficiency and a fluid mixer 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fluid controller comprising:

a fluid channel deforming portion including:

an upstream end portion having a first most upstream opening and a second most upstream opening through which fluids are caused to flow from upstream pipes;

a first channel communicating with the first most upstream opening;

a second channel communicating with the second most upstream opening; and a channel terminating portion having a first most downstream opening of the first channel and a second most downstream opening of the second channel, the first channel and the second channel being interposed between the channel terminating portion and the upstream end portion, wherein:

an aperture ratio of the first channel and the second channel is made substantially constant from the upstream end portion to the channel terminating portion;

at least one of the first channel and the second channel is deformed between the upstream end portion and the channel terminating portion;

a region of the second channel adjacent to the first channel in a second cross-section which is located downstream from a first cross-section and which is perpendicular to an extending direction of the first channel and the second channel, is increased more than a region of the second channel adjacent to the first channel in the first cross-section perpendicular to the extending direction of the first channel and the second channel, from upstream toward downstream, between the upstream end portion and the channel terminating portion, the first channel and the second channel being adjacent in multiple directions in the channel terminating portion; and a mixing portion provided downstream from the first most downstream opening and the second most downstream opening, the mixing portion being configured to mix a plurality of fluids flowing through the first most downstream opening and the second most downstream opening, and the mixing portion including a mixing channel having a third most downstream opening located most downstream of the mixing portion, the third most downstream opening being configured to discharge mixed fluids into which the plurality of fluids are mixed toward a downstream side of the mixing portion.

2. The fluid controller of claim 1, wherein at least one of the first channel and the second channel has a portion whose arrangement and fluid channel shape are gradually deformed between the upstream end portion and the channel terminating portion.

3. The fluid controller of claim 1, wherein at least one of the first channel and the second channel is branched into a plurality of flow paths between the upstream end portion and the channel terminating portion.

4. The fluid controller of claim 1, wherein:

the first channel is branched into a plurality of flow paths between the upstream end portion and the channel terminating portion, and at least a part of the second channel is present in a region imaginary connecting any closest pair of the flow paths of the first channel in the second cross-section of the fluid channel deforming portion.

5. The fluid controller of claim 3, wherein the flow paths of the first channel or the flow paths of the second channel exist in all directions with respect to any one of the flow paths of the first channel in the second cross-section of the fluid channel deforming portion.

6. The fluid controller of claim 1, wherein the first channel and the second channel of the fluid channel deforming portion extend in a same direction from the upstream end portion to the channel terminating portion.

7. The fluid controller of claim 1, wherein:

the first channel and the second channel are branched into a plurality of flow paths between the upstream end portion and the channel terminating portion, and a ratio of a total length of sides of the flow paths of the second channel in the second cross-section and adjacent to sides of the flow paths of the first channel to a total length of sides of the first channel in the second cross-section is ½ or more.

8. The fluid controller of claim 1, wherein when an average perimeter of an annular edge of the first channel and the second channel in the second cross-section of the fluid channel deforming portion is L and an average inside area of the annular edge of the first channel and the second channel is S, an equation is given as follows:

$$D=4*S/L$$

where D is an equivalent diameter of the annular edge of the first channel and the second channel is 10 mm or shorter.

9. The fluid controller of claim 1, wherein an inside area of the first most upstream opening is smaller than a total inside area of the first channel in the second cross-section of the fluid channel deforming portion.

10. The fluid controller of claim 1, wherein:

the first channel is branched into a plurality of flow paths between the upstream end portion and the channel terminating portion, and a shape or a size of one of the flow paths of the first channel at a first arbitrary position is different from a shape or a size of another of the flow paths of the first channel at a second arbitrary position different from the first arbitrary position in the second cross-section of the fluid channel deforming portion.

11. The fluid controller of claim 1, wherein:

the upstream end portion of the fluid channel deforming portion has a third most uppermost opening through which a fluid flows from the upstream pipe;

the fluid channel deforming portion includes a third channel provided adjacent to the first channel and the second channel to communicate with the third most upstream opening downstream from the upstream end portion;

the fluid channel deforming portion increases a region of the third channel adjacent to the first channel in the second cross-section more than a region of the third channel adjacent to the first channel in the first cross-section between the upstream end portion and the channel terminating portion; and at least one of the first channel, the second channel and the third channel has a shape of a hexagon in the second cross-section of the fluid channel deforming portion.

12. The fluid controller of claim 1, wherein a material whose thermal conductivity is higher than thermal conductivity of a material serving as a base material to form fluid channel walls of the first channel and the second channel, is placed on inner surfaces of the fluid channel walls.

13. The fluid controller of claim 1, wherein:

the fluid channel deforming portion includes a fluid introduction section in which there is a one-to-one correspondence between the first channel adjacent to a downstream side of the upstream end portion and the first most upstream opening; and a total sum of inside fluid channel areas of the first most upstream opening of the upstream end portion is smaller than a total sum of fluid channel areas of the first channel at a most downstream position of the introduction section.

14. The fluid controller of claim 13, wherein the fluid channel areas of the first channel increase gradually toward downstream in a cross-section perpendicular to the extending direction of the first channel in the introduction section.

15. The fluid controller of claim 1, wherein:

the mixing portion further includes:

a mixing section communicating with the first most downstream opening and the second most downstream opening downstream from the channel terminating portion to mix the fluids flowing through the first channel and the second channel in the mixing channel; and a discharge section having the third most downstream opening downstream from the mixing section to discharge the mixed fluids mixed in the mixing channel of the mixing section through the mixing channel, and an inside fluid channel area of the mixing channel in one cross-section perpendicular to an extending direction of the mixing channel in the mixing section of the mixing portion is larger than an inside fluid channel area of the third most downstream opening in the discharge section.

16. The fluid controller of claim 15, wherein the inside fluid channel area of the mixing channel of the mixing portion decreases gradually toward downstream.

17. A fluid mixer comprising:

a fluid controller of claim 1;

an upstream pipe located upstream from the fluid controller; and a downstream pipe located downstream from the fluid controller.

18. The fluid mixer of claim 17, wherein:

the upstream pipe includes a first pipe and a second pipe; and the upstream pipe and the fluid channel deforming portion include an upstream connector to align the fluid channel deforming portion and the upstream pipe such that the first most upstream opening and the first pipe of the upstream pipe are connected and the second most upstream opening of the upstream end portion and the second pipe of the upstream pipe are connected.

19. The fluid mixer of claim 17, wherein the mixing portion and the downstream pipe include a downstream connector to align the mixing portion and the downstream pipe such that the third most downstream opening and the downstream pipe are connected.

20. The fluid controller of claim 1, wherein the first channel, the second channel and the mixing channel are each formed as a microchannel.

* * * * *